US011012885B2

United States Patent
Irwin et al.

(10) Patent No.: US 11,012,885 B2
(45) Date of Patent: *May 18, 2021

(54) ADAPTABLE ULTRA-NARROWBAND SOFTWARE DEFINED RADIO DEVICE, SYSTEM, AND METHOD

(71) Applicant: Agile Radio Management Inc., Sparks, NV (US)

(72) Inventors: Thomas W Irwin, Sparks, NV (US); Kyle Anthony Stanton, Sparks, NV (US); Surjit Brad Gill, Sparks, NV (US); Carlos Alfonso Salcido, Jr., Sparks, NV (US)

(73) Assignee: Agile Radio Management Inc., Sparks, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,788

(22) Filed: Dec. 3, 2019

(65) Prior Publication Data
US 2020/0178108 A1 Jun. 4, 2020

Related U.S. Application Data

(63) Continuation of application No. 15/380,765, filed on Dec. 15, 2016, now Pat. No. 10,531,328.
(Continued)

(51) Int. Cl.
*H04W 28/02* (2009.01)
*H04L 12/26* (2006.01)
*H04W 4/10* (2009.01)

(52) U.S. Cl.
CPC ......... *H04W 28/0252* (2013.01); *H04L 43/16* (2013.01); *H04W 4/10* (2013.01); *H04W 28/0268* (2013.01)

(58) Field of Classification Search
CPC ....... H01Q 1/04; H04L 12/2856; H04L 12/66; H04L 25/03834; H04L 25/49; H04B 1/163
See application file for complete search history.

(56) References Cited

U.S. PATENT DOCUMENTS 4,852,086 A 7/1989 Eastmond et al.
5,222,250 A 6/1993 Cleveland et al.
(Continued)

FOREIGN PATENT DOCUMENTS

WO 2001017292 A1 3/2001

OTHER PUBLICATIONS

Ellis, "Why 220Mz?," Urgent Communications, Feb. 7, 2002 [retreived Apr. 26, 2019], https://urgentcomm.com/2002/02/07/why-220mhz-2/, 8 pages.
(Continued)

*Primary Examiner* — Natasha W Cosme
(74) *Attorney, Agent, or Firm* — Davis Wright Tremaine LLP

(57) ABSTRACT

Devices, systems, and methods are described herein for communicating data using an adjustable software defined radio. In one aspect, an ultra-narrowband communication device may include a radio frequency (RF) element and a computing element communicatively coupled to the RF element. The computing element, which may include at least one processor and memory, may define a software defined radio. The memory of the computing element may store instructions, that when executed by the at least one processor, configure the communication device to at least one of transmit or receive data over at least two different ultra-narrowband channels using a first communication protocol. The software defined radio may be adjustable to operate at
(Continued)

any of a variety of different ultra-narrowband channels responsive to a frequency band selection or allocation.

20 Claims, 18 Drawing Sheets

Related U.S. Application Data

(60) Provisional application No. 62/269,519, filed on Dec. 18, 2015.

(56) References Cited

U.S. PATENT DOCUMENTS

| | | | |
|---|---|---|---|
| 5,339,057 A | 8/1994 | Rauscher | |
| 5,471,661 A | 11/1995 | Atkinson | |
| 7,583,725 B1 * | 9/2009 | Dick | H04L 1/0033 375/219 |
| 2003/0031146 A1 | 2/2003 | Sugaya | |
| 2004/0121731 A1 | 6/2004 | Walker | |
| 2004/0203834 A1 | 10/2004 | Mahany | |
| 2006/0030277 A1 | 2/2006 | Cyr et al. | |
| 2007/0237218 A1 | 10/2007 | Walker | |
| 2008/0043868 A1 | 2/2008 | Feher | |
| 2008/0101284 A1 | 5/2008 | Buchwald et al. | |
| 2010/0074371 A1 * | 3/2010 | West | H04L 27/24 375/316 |
| 2011/0199960 A1 | 8/2011 | Fukuzawa et al. | |
| 2012/0219039 A1 | 8/2012 | Feher | |
| 2013/0070810 A1 | 3/2013 | Rappaport | |
| 2015/0156749 A1 | 6/2015 | Yun et al. | |
| 2015/0264549 A1 | 9/2015 | Feher | |
| 2015/0271339 A1 | 9/2015 | Klein et al. | |

OTHER PUBLICATIONS

PCT International Search Report and Written Opinion, corresponding to PCT/US2016/067019, dated Apr. 21, 2017, 21 pages.

* cited by examiner

ADAPTABLE ULTRA-NARROWBAND SOFTWARE DEFINED RADIO DEVICE, SYSTEM, AND METHOD

CROSS-REFERENCE TO RELATED APPLICATIONS

This application is a continuation of U.S. patent application Ser. No. 15/380,765, filed on Dec. 15, 2016, entitled "ADAPTABLE ULTRA-NARROWBAND SOFTWARE DEFINED RADIO DEVICE, SYSTEM, AND METHOD," which claims the benefit of U.S. Patent Application No. 62/269,519, filed on Dec. 18, 2015, entitled "ADAPTABLE ULTRA-NARROWBAND SOFTWARE DEFINED RADIO DEVICE, SYSTEM, AND METHOD," the disclosure of which is hereby incorporated herein in its entirety.

COPYRIGHT

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF TECHNOLOGY

This disclosure relates generally to communication devices and systems, and more specifically to using software defined radios to communicate with each other over available spectrum, for example, using adjustable ultra-narrowband channels.

BACKGROUND

Various communication technologies in different spectrums and regions of spectrum continue to face obstacles. Given that radio spectrum is finite, the Federal Communications Commission (FCC) has in the past and continues to encourage the development and use of technology that makes efficient use of the radio spectrum. To this end, the FCC allocated a region of the radio spectrum from 220-222 MHz for, at least in part, the purpose of spurring the development and acceptance of new narrowband technologies. The 220-222 MHz range allocated by the FCC is divided up into 400 5 kHz-wide frequency ranges paired to provide 200 channels, such channels known as ultra-narrowband channels.

Some radio technologies implemented Amplitude Compandored Single Sideband (ACSB) signal processing systems/modulation to try and accommodate communication of data over these ultra-narrowband channels (5 KHz) within the 220-222 MHZ range, such as U.S. Pat. No. 5,222,250, titled SINGLE SIDEBAND RADIO SIGNAL PROCESSING SYSTEM, which issued Jun. 22, 1993. However, these radios were not widely used due to limited applications and the cost of dedicated hardware to enable these radios to operate via ultra-narrowbands and in the 220-222 MHz space. Typically, there was a need for specialty components and filters for each different band of intended use, limiting the application and practicality of this type of approach.

Traditional radios were able to transmit and receive radio signals across a short band. For example, the frequency span of a standard FM radio used to transmit or receive commercial FM music stations ranges from 88 Mhz to 109 Mhz. Frequencies outside this range could not be transmitted or received by frequencies that reside outside this identified spectrum making their use limited to that band. Additionally, traditional radios only support predetermined modulation schemes. In the example above, Frequency Modulation or FM was used to encode and decode the information over the radio waves.

In addition, other allocated frequency bands included stop bands in between usable bands of various sizes. Some technologies attempted to use these stop bands for communication, but due to the limited size of some of these stop bands, and the relative large amount of bandwidth required for various communications, some stop bands have yet to be effectively utilized.

Narrowband is currently defined as having an operational bandwidth of less than 6.25 Khz. Ultra-narrowband is currently defined as having bandwidth of less than 5 Khz. Typically, commercial usage has mostly been confined to the narrowband spectrums which the FCC has made prevalent in the land mobile radio and push to talk consumer radio spaces. While 6.25 Khz is common place, 5 Khz band requirements typically existed on only select bands such as the 220-222 Mhz spectrum. Ultra-narrowband was the FCC's attempt to conserve spectrum though the utilization of small bandwidths over identified spectrum. Requirements were not translated to other spectrum leaving the 220-222 Mhz spectrum as the only one requiring ultra-narrowband operation.

The FCC and other spectrum governing bodies might someday change regulations to increase the use of available spectrum. Changes such as these typically require slow implementation cycles where customers or often subjected to undue financial strain by having to, for example, repeatedly purchase new radios or equipment to be compliant with required changes.

As a result, improvements can be made to communication technology to better utilize available spectrum.

BRIEF SUMMARY OF SOME ASPECTS OF THE DISCLOSURE

The applicants believe that they have discovered at least one or more of the problems and issues with systems and methods noted above, as well as advantages variously provided by differing embodiments of the adaptable ultra-narrowband software defined radio disclosed in this specification. Illustrative examples of the disclosure include, without limitation, methods, systems, and various devices. In one aspect, an ultra-narrowband communication device may include a radio frequency (RF) element and a computing element communicatively coupled to the RF element. The computing element, which may include at least one processor and memory, may define a software defined radio. The memory of the computing element may store instructions, that when executed by the at least one processor, configure the communication device to at least one of transmit or receive data over at least two different ultra-narrowband channels using a first communication protocol. In some embodiments, the software defined radio is adjustable to operate at any of a variety of different ultra-narrowband channels responsive to a frequency band selection or allocation.

In another aspect, a narrowband or ultra-narrowband communication system, may include a narrowband or ultra-narrowband communication device. The narrowband or ultra-narrowband communication device may be configured to selectively communicate at least one data packet over a first narrowband channel or a first ultra-narrowband channel. The communication system may further include at least one repeater device. The repeater device may be configured to receive the at least one data packet and re-transmit the at least one data packet to a second communication device over one or more of the first narrowband channel, the first ultra-narrowband channel, a second narrowband channel, or a second ultra-narrowband channel.

In another aspect, a non-transitory computer-readable medium may include instructions, that when executed by a processor of a communication device, cause the communication device to perform various operations. Those operations may include obtaining at least one channel allocation for communicating data. The operations may further include adjusting a software defined radio of the communication device to communicate over at least one channel corresponding to the at least one channel allocation. The operations may additionally include transmitting data over the at least one channel via the adjusted software defined radio.

The adjustable frequency band, software defined radio may provide a number of benefits, advantages, or both over existing technology. The software defined radio provides a hardware platform from which software can be loaded and changed over time to support changing needs in spectrum bandwidth and modulation. For example, the described software defined radio can, in some instances, be utilized from 70 Mhz to 6 Ghz, enabling access and transmission of information across several available bands. The software defined radio is adaptable in that with more programming, it may become more sophisticated over time as users add programming applications and specific tasking functions. Due to this capability, the software defined radio is capable of growing with customer demands and needs across many bands of interest.

In some cases, the adjustable software defined radio may enable better data communication in areas where other wireless technologies networks are unavailable, and may enable utilization of the 220-222 MHZ spectrum that has been under utilized due, at least in part, to a lack of supporting technology and high barriers to entry, such as, for example, high cost and the inflexibility of dedicated hardware. The implementation of adjustable software defined radios, repeater devices, or both may provide a fully functioning and integratable communication system that may provide communication capabilities in areas not supported or under-supported by other communication technologies. The software defined radio may support multiple channel configurations that allow for cross (radio) network communications with support for a variety of data to be communicated, including, voice, text, or data with trunking information, among others. An example of cross (radio) network communication may include connecting a 900 Mhz PTT network to a 220-222 Mhz PTT network for expanded communications during natural disasters.

The communication device and system described herein may address the lack of manufactured radios and repeating systems for the 220-222 Mhz ACSB network, may address a need for a configurable radio platform that can be programmed via software to meet the users spectrum and power output needs, or both. In some aspects, the described device and system may utilize ACSB modulation, for example, described in detail in U.S. Pat. No. 5,222,250, the contents of which are herein incorporated by reference. However, the software defined radio may improve upon the ultra-narrowband system described in the U.S. Pat. No. 5,222,250 patent by eliminating the need for specialty components and filters for each different band of intended use, via the integration of the software defined radio disclosed herein. This design allows the radio to be reconfigured via software, creating versatility relating to which spectrum it operates in. For example, a single adjustable software defined radio communication device may allow all bands to be monitored and communicated over between 70 M1-1 z-6 GHz. The software defined radio may be hosted by a full operating system, which may enable remote administration and communications backhaul over the internet, for example, with enhanced configurable security options. This can improve the operation and robustness of the communication devices, as well as enhance the longevity and return on investment of the device and system.

It is to be understood that the foregoing is only a brief summary of some aspects of the present disclosure, but neither the Background nor this brief summary are intended to be limiting. The present specification discloses many other novel features, problem solutions, and advantages; and they will become apparent as this specification proceeds. In this regard, the scope of an issued claim based on this specification is to be determined by the claim as issued and not by whether it addresses an issue set forth in the above Background or includes a feature problem solution, or advantage recited in this brief summary.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by lowercase letter second reference label that distinguishes among the similar components. If only the first reference label is used in the specification, the description is applicable to any one of the similar components having the same first reference label irrespective of the second reference label. Embodiments of the present disclosure will be described more fully hereinafter with reference to the accompanying drawings, in which.

Figure 1:
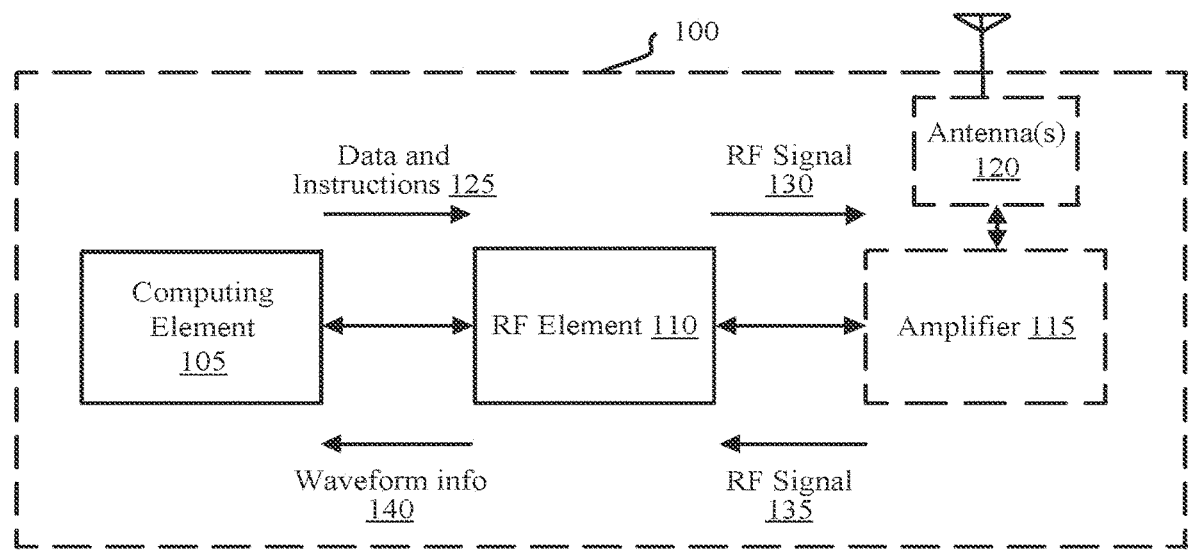
FIG. 1 is a block diagram of an example communications device including a software defined radio.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF THE PREFERRED AND OTHER EMBODIMENTS

Systems and techniques are described herein for communicating over frequency bands, such as ultra-narrowband channels, using a software defined radio that is configured to change the frequency, the bandwidth, or both, of the one or more channels used based on one or more factors. In one aspect, a communication device may include a software defined radio, for example, implemented by a computing device, that may interface with one or more radio frequency (RF) elements or components to communicate over a plurality of selectable or adjustable frequency channels, such as ultra-narrowband frequency channels, in a wide range of frequency spectrum. In one implementation, the software defined radio/communication device may be configured to operate within the 200-220 MHz frequency range, and in other implementations, the software defined radio may be configured to operate on a much larger range, such as 70 MHz to 1.4 GHz, or even 70 MHz to 6 GHz or 70 MHz to 8 GHz. In some examples, the communication device may utilize Amplitude Compandored Single Sideband (ACSB) processing/modulation, or at least be compatible with ACSB modulation, to efficiently communicate data in ultra-narrowband channels. In other examples, the communication device may utilize other modulation schemes for communication of data.

In some aspects, the communication device, which may herein be referred to as an adjustable software defined radio or software defined radio, may include components to communicate via a second communication link or protocol, such as over the internet, or utilizing any of a variety of available wired or wireless communication technologies, such as 3G, LTE, WiFi, Bluetooth, ZigBee, UWB, etc.

In some aspects, the adjustable software defined radio, may connect to a second nearby device, such as a smart phone, tablet, or other computing device, vehicle computing system and so on. The second communication device may interface with the adjustable software defined radio and provide, for example, a user interface to enable configuration of the adjustable software defined radio. In some cases, the second communication device may provide other network or communication capabilities, such as communicating data, for example, on behalf of the adjustable software defined radio, to other devices that may be out of range of the adjustable software defined radio via radio communication, to link up a larger network.

In some aspects, the adjustable software defined radio may be implemented as a repeater device, which is configured to receive and retransmit data to another repeater device or a recipient device, for example, when the adjustable software defined radio is outside of communication range of an intended recipient device. In some cases, multiple repeater devices may be utilized to implement a mesh or hybrid mesh network. In yet some other cases, multiple repeater devices may additionally communicate with each other via the internet to create a larger network.

In one example, the adjustable software defined radio or repeater device may be configured to receive data from legacy devices, such as existing ultra-narrowband enabled devices, to reroute the data through a repeater enabled network to improve the performance of the existing system, devices, or both.

Referring now to FIG. 1, in some embodiments, communication device 100 utilizes a software defined radio. The communication device 100 may include a computing element 105, an RF element 110, an optional amplifier 115 (dashed lines as used throughout this disclosure indicate optional, and not required components, process steps, etc.), and one or more antennas 120. The computing element may host a software defined radio, that may interface with the RF element 110, to provide various functions for sending and receiving data via antennas 120, amplifier 115, or both. The computing element may include one or more hardware devices (microprocessors, Field Programmable Gate Array (FPGA), Digital Signal Processors (DSP) and other computing/logic devices) that host operating software, which implements the software defined radio. The operating software may handle all timing, synchronization, and adjustments to the radio's spectrum, modulation, and power output, for example. Operational software within the computing element 105 may sample and digitize the incoming data, and modulate that data on the selected carrier in software. The resulting data may be converted back to an analog waveform for transmission by the RF element 110.

The software defined radio may configure various aspects of data to be transmitted and data received by the communication device 100, such as performing frequency selection, modulation, companding, filtering, amplification (e.g., in some cases in combination with amplifier 115), via programmable logic. As used herein, a software defined radio implements various functionality similar to that previously provided via hardware components, such as mixers, filters, amplifiers, modulators/demodulators, detectors, etc., through software or executable instructions and/or embedded systems. A primary advantage of using a software defined radio is that data may be communicated over selectable or adjustable spectrum and bandwidth, without requiring changes in hardware. The software defined radio may interface with the RF element 110 to condition data for communication over various spectrum and having different bandwidths.

In one example, the computing element 105 may process commands and define the characteristics of the RF waveform. The computing element 105 may contain an operating system and may interface to external media such as USB. The computing element 105 (e.g., the software defined radio hosted by the computing element 105) may send the data and instructions for sending data to the RF element 110 at operation 125. In some cases, the instructions may include specific frequency information concerning which channel or channels to use for transmitting the data, and/or bandwidth information of the channel or channels. The instructions may also include encoding information, modulation information, and other information required for the transmission of data, for example, according to a selected encoding or modulation scheme.

Upon receiving the instructions at 125, the RF element 110 may process the instructions and translate the data from the computing element 105 into radio transmissions (generating the RF waveform). This may include performing duplexing operations, digital to analogue conversions, and so on, as is known to those of skill in the art. The RF element 110 may then send the process data, which forms an RF signal (e.g., analogue), to the amplifier 115 at operation 130. The amplifier 115, which may be optional, depending on the specific implementation of the communication device 100 (e.g., as a portable unit, a repeater, or otherwise, as will be described in greater detail below), may amplify the RF signal across its operational spectrum for the purposes of increasing power output and effective maximum range for the radio. In one aspect, amplifier 115 may be particularly useful in a repeater implementation, as will be described in greater detail below. One or more antennas or similar radiating structures 120 may transmit the RF signal. However, as technology is improved, it may be possible to achieve desired results without the need of a separate amplifier 115. The amplifier 115 may be integrated into the RF element 110 of the design to simplify complexity and limit interconnects.

The communication device 100 may receive and process data in a similar, but reverse order. This may include receiving data via antennas 120, amplifying and/or filtering the RF signal at operation 135, processing the RF signal by the RF element 110, and providing waveform information (e.g., data) to the computing element 105, at operation 140.

In some aspects, communication device 100 may implement channel or carrier aggregation to increase bandwidth and/or throughput in the communication of data. In some cases, the channel aggregation may include transmitting data over multiple adjacent channels or multiple non-contiguous channels. In some examples, channel aggregation may be particularly useful when the communication device 100 communicates data over ultra-narrowband channels, as the amount of data that can be transmitted/received over 5 kHz may otherwise limit the types of data that can be communicated over such channels. By combining multiple ultra-narrowband channels, either adjacent or non-contiguous, more data may effectively be communicated. In some aspects, RF element 110 may include multiple RF transceivers to enable channel aggregation, for example, particularly in the non-contiguous channel examples. In yet some other examples, communication device 100 may implement multiple input multiple output (MIMO) techniques and/or other techniques known to in the wireless communication space to increase throughput and/or bandwidth, reduce interference, etc.

In some cases, the communication device 100 may be configured to communicate through more than one communication protocol, such as utilizing 3G, LTE, Bluetooth, or other wired or wireless communication links to enhance or compliment the primary communication of data.

In one example, the computing element 105, RF element 110, amplifier 115, and/or antenna(s) 120 may be selected and/configured to communicate data over one or more ultra-narrowband channels (e.g., 5 KHz) in frequency range of 220-222 MHz. In this scenario, the computing element 105 and RF element 110 may be configured to implement ACSB modulation, to more effectively communicate data in such a narrow frequency bandwidth. In other cases, one or more elements of communication device 100 may be selected and/or configured to process and communicate data within a greater range of frequencies and different channel allocations, different bandwidths, etc. A benefit of the configuration of communication device 100 is the ability to selectively change or adapt the channels, bandwidth, modulation, etc., of data to be communicated based on one or more factors, including, for example, environmental considerations, signal propagation considerations, nearby communications devices, intended recipient devices, available communication networks, and so on.

In some cases, antenna(s) 120 may be selected according to the desired frequency range of use of the communication device 100. For example, antenna choice can either broaden the potential spectrum availability or narrow it depending on application. Certain antennas can be selected that will allow coverage over the entire area of potential operation, such as 70 Mhz 1.4 Ghz, 70 MHz-6 GHz, etc., or antennas can be tuned for specific frequency of interest 220-220 Mhz. Antenna choice may impact the output parameters of the system, but may not significantly impact the operation of the computing element 105 or RF element 110.

Various types of antennas may be paired with the computing element 105, RF element 10, and/or amplifier 115, such as modified PIFA, planar meander line, folded loop, modified dipole, monopole, and so on. In one aspect, a fractal antenna may be used. A fractal antenna is an antenna that uses a fractal or self-similar design to maximize the length, or increase the perimeter of material that can receive or transmit electromagnetic radiation within a given total surface area or volume. As such, fractal antennas may provide good performance over a wider range of frequencies. Fractal antennas may be very compact, multiband or wideband. For these reasons, pairing one or more fractal antennas with a software defined radio may provide a large range of adjustability with good performance.

In one aspect, the communication device may further implement or include cognitive radio or the functionality thereof. A cognitive radio is an intelligent radio that can be programmed and configured dynamically. The transceiver in a cognitive radio device (e.g., RF element 110 and/or antennas 120) may be designed to use the best wireless channels in its vicinity. Such a radio may automatically detect available channels in wireless spectrum. Based on the detection, transmission or reception parameters of the radio may be modified to allow more concurrent wireless communications in a given spectrum band at one location. In this aspect, the communication device 100 may search for the best available spectrum, and adapt it communication parameters to utilize the best available spectrum (e.g., frequency channel and bandwidth.

Cognitive radio capability may be achieved through the use of software defined radio architecture. A cognitive radio is a radio capable of listening to the RF traffic and determining which network to utilize to best meet the users needs. For example, if a user with a cognitive radio needs to communicate, they would turn on the radio. After the radio is switched on it would scan all available frequencies or frequencies within a selected range, for a potential connection. Once a potential connection is found, the radio would then negotiate access to the network with a repeater or begin point-to-point communications with those on a non-repeater capable network. The concept of self-tuning and negotiating stabile links is at the forefront of cognitive radio functionality. Since a cognitive radio is one that measures the RF activity of radio networks around it and optimizes performance to those characteristics, it is important that a cognitive radio be very flexible in its ability to measure and tune to all available and approved frequencies while supporting a wide format of modulation schemes. Traditionally cognitive radios utilize an array of pre-programmed known spectrum and modulation formats. In this instance cognitive radio capabilities will be combined with those found in software defined radio formats, which will allow greater spectrum coverage and a more flexible array of modulation schemes in an effort to further a cognitive radio's capabilities. Cognitive radios may also be able to support a wide array of network topologies including but not limited to point-to-point, hub and spoke, IP, and mesh network depending on what is available. Beyond communicating with available formats, a cognitive radio is also aware of the noise present on each band and therefore can tune its performance to incorporate bands that can facilitate a connection best suited for the users usage and bandwidth needs. This allows the user to connect to the best communication formats available given noise and spectrum saturation.

In some cases, the computing element 105 and/or the RF element 110 may be configured to scan available bands within a certain frequency range, such as 70 Mhz to 6 GHz, 70 MHz to 8 GHz, or any other range. When an available radio communication format is found active, the computing element 105 may then compare the active signal against onboard or remote databases, and known modulation schemes to decode portions of the data received in an effort to determine who the host is and how to appropriately establish communication. Once the spectrum and modulation are determined, the radio may then attempt communication with the radio or radios on the determined spectrum. Additionally, modulation learning and frequency sweeping techniques can be utilized to provide a learning capability to cognitive radios that will allow the use of radio networks not in the database. This functionality may be administrated via established rules in association with the US FCC and the US Department of Defense in an effort to avoid unauthorized personnel from accessing advanced learning features or accessing spectrum that the user is not authorized to access.

In one aspect, a full cognitive radio or the functionality thereof may be utilized, whereby the full cognitive radio takes into account all parameters that a wireless node or network is capable of being aware of In other cases, a spectrum cognitive radio may be utilized, in which a frequency spectrum may be defined, and only channels within that spectrum may be scanned.

It should be appreciated that traditional radios can be utilized to achieve similar results in transmission and reception of radio remissions as described above; however these radios are limited to the specific bandwidth for which they are designed. Additionally, traditional radios typically cannot be used to create solutions including a cognitive radio, as traditional radios lack the ability to change their tuning characteristics across a wide band area.

The communication device 100, as described herein, may assume a number of different configurations, with each including the basic elements described above, and/or other additional elements.

In one aspect, the communication device 100 may assume a handheld mobile configuration or individual radio unit (IRU), for example, having a small form factor (e.g., casing or housing, power source, etc.) for personal use. An IRU can be thought of as an endpoint of the communications network, and may be the largest producer and consumer of data, messages, PTT voice and other information exchanges (collectively referred to as "data") upon the network. An IRU may encode, modulate and transmit data that is produced locally, either by the radio itself, the radio operator, or by data-connected equipment nearby, in order to make that data available elsewhere. IRUs also receive, demodulate, and decode data generated elsewhere for use locally. This can mean the data is used by the IRU itself, by a voice PTT user listening to it, by data-connected computing equipment, or other means of data consumption.

The IRU or mobile radio may be the size of current smart phone devices, or may be smaller or larger depending on a variety of factors, including, for example, screen/interface to configure the radio, power usage requirements, range of the radio, and the like. The mobile radio configuration may support other communication protocols (e.g., LTE, Bluetooth, etc.), may be able to connect to the internet, may provide a user interface for configuring and using the radio, may implement a touch screen, a keyboard or partial keyboard and the like to accessing the user interface, etc.

In some applications, IRUs have the requirement of being able to transmit at, but not above, an output power of 5 W. This is imposed by FCC regulations and cannot be easily circumvented. IRUs can perform a majority of communications using one transmit and receive pair (e.g., 2 channels), and while some end unit IRUs may have more than that, they are typically not specified to require it.

In some aspects, the communication device 100 may assume a smart device accessory configuration, which may be configured to connect to other computing devices, such as smart phones, tablets, etc., to utilize features of these other devices. In one example, the smart device accessory may connect to a proximate smart device (e.g., via Bluetooth or other communication protocol) and utilize the smart device to provide a user interface via an application running on the smart device to configure or adjust the smart device accessory. In another example, the smart device accessory may link up to a headset, for example, via Bluetooth. In this configuration, the radio becomes an extension of the smart device in that it allows the device to directly access data and voice networks via the radio which extends the communications capability of the smart device beyond traditional cell phone and WiFi options.

In another aspect, the communication device 100 may assume a mobile service unit configuration, for example, designed to be installed into vehicles to provide communication to fixed facilities as well as point-to-point communications between like radios or communications devices.

In one aspect, the communication device may be implemented as a repeater or radio repeater unit (RPT), for connecting mobile radios together via rebroadcasting signals received from devices that may otherwise be outside of communication range with each other. The repeater implementation may be a fixed installation, for example, designed for spectrum owners and operators to service their local area from a tower or fixed facility. These installations can establish a large communications coverage area for multiple mobile type radios or communication devices. In other cases, the repeaters may be mobile, such as having smaller power sources and potentially less range. Mobile repeaters may be utilized in rural areas, for example, and moved depending on the needs of the data to be relayed.

An RPT may be installed in a remote equipment housing of some kind, such as a radio room, a shed, a bunker or environmentally-ruggedized cabinet. These can be in relocatable temporary installations, or more-commonly, in fixed permanent (infrastructure) locations. The RPTs are essentially the central hubs of the communications network. In most cases, IRUs communicate through a RTP in the following way. RPTs may receive data generated elsewhere, but may not demodulate or decode the data for local use. An RPT's primary function is to echo the received data back out to the network, usually at a much higher power level, on the same or a different frequency that it was received upon. A repeater may not produce or generate its own data locally. Data transmitted by the RPT typically will be generated elsewhere, received on one of several input channels and is merely being echoed for other IRUs or data recipients to receive, demodulate, decode, and use.

RPTs may have some one or more increased operational characteristics that may require larger, heavier units than IRUs. For example, the repeater may be larger due, at least in part, to a larger receiver amplifier and a transmit amplifier that can be in the range of hundreds of Watts. In addition to the more-powerful RF hardware, it may also need to be capable of monitoring, and sometimes processing, multiple channels of data simultaneously. This can include the implementation of multiple TX/RX pairs in order to fulfill such requirements. It is this multi-channel capability that makes the network functional on the macro-scale. In some cases, multiple TX/RX pairs may be implemented by a more complex transceiver or RF element 110 or by additional hardware. In some aspects, each repeater may maintain a database for regular data-logging, for example, to remember previous connection configurations, routing information, and the like. In some cases, the database or memory may be used to support billing and debugging operations.

In some aspects, the computing element 105 may be hosted over the cloud in certain circumstances, such as where many repeaters are connected to each other via the internet. In this model, the connected repeaters may share information collected from each repeater's coverage area. This information can then be compiled to provide a result that allows each to operate in a cognitive manner with surrounding spectrum for maximum spectral bandwidth efficiency and utilization. In other aspects, the computing element 105 may be otherwise located off board from the other components of the communication device 100 (e.g., such as in a blade server and the like), but still proximate to or co-located with and in wired or wireless communication with the remaining components communication device 100.

Figure 2A:
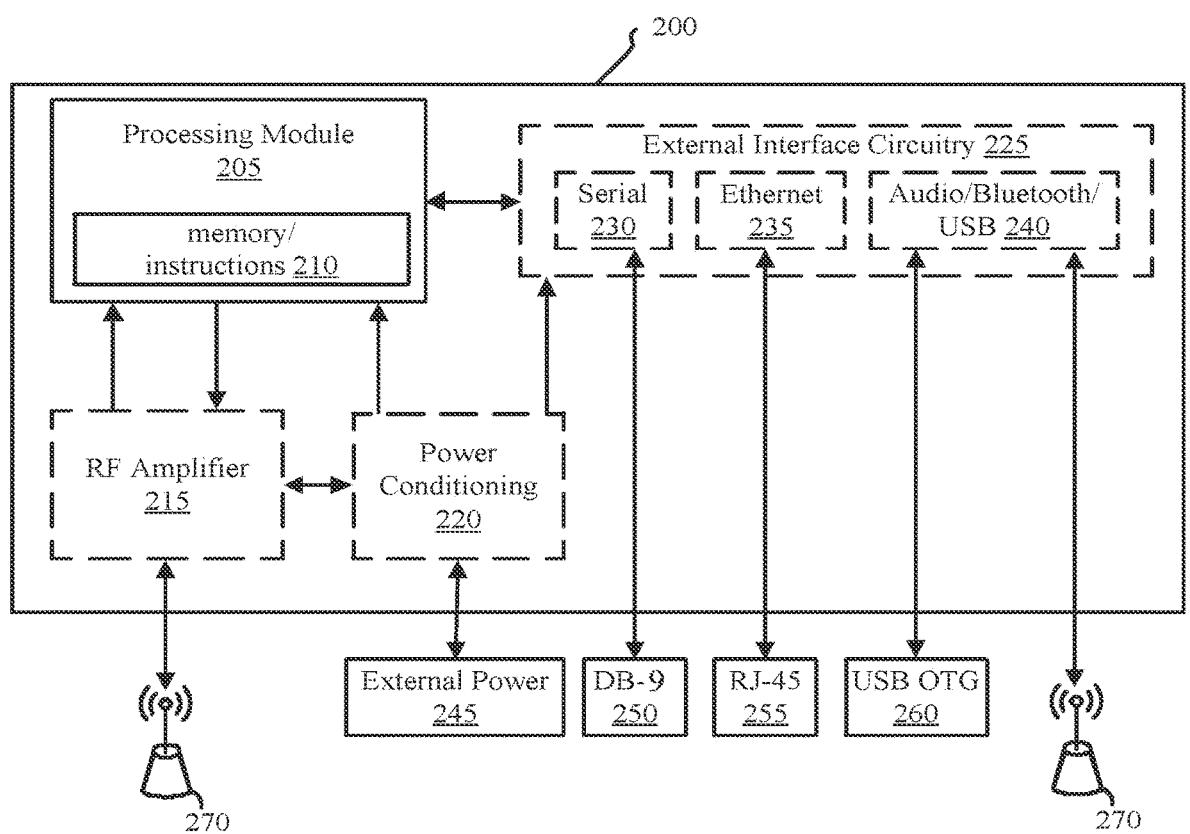
FIG. 2A is a block diagram of another example of a communication device implementing a software defined radio.

Referring now to FIG. 2A, in some embodiments, communication device 200 utilizes a software defined radio to communicate over various selectable channels having various bandwidths. In some aspects, communication device 200 may include one or more aspects of communication device 100 described above in reference to FIG. 1. Communication device 200 may include a processing module 205 that may execute instructions stored in memory 210. Processing module 205 may include the computing element 105 and RF element 110 of communication device 100. Instructions 210 may implement a software defined radio, as described above. The processing module 205 may communicate with other devices 270 via RF amplifier 215, as also described above.

The processing module 205 may communicate with external interface circuitry 225, which may include serial 230, Ethernet 235, and audio/Bluetooth, USB, or others (e.g., ADIO, HDMI) 240 interfaces. These interfaces 230, 235, 240, which are optional, may communicate with other external devices 270, via DB-9 cables 250, RJ-45 cables 255, USB 260, or wirelessly via, for example, a Bluetooth connection. It should be appreciated that other interfaces and/or connectors may be utilized and supported by device 200, for example, according to specific implementations. The processing module 205, the RF amplifier 215, and the external interface circuitry 225 may be powered by an external power source 245, which may be conditioned via power conditioning unit 220. It may be appreciated that a variety of different power sources 245 may be utilized, including portable, mobile, or fixed power sources.

In some aspects, the described software defined radio solutions may make use of SD card interfaces, as part of memory 210, to load and manage software on the radio device itself In other iterations this could be changed to make use of onboard memory or be changed/enhanced to make use of USB memory sticks and other common forms of memory storage.

Figure 2B:
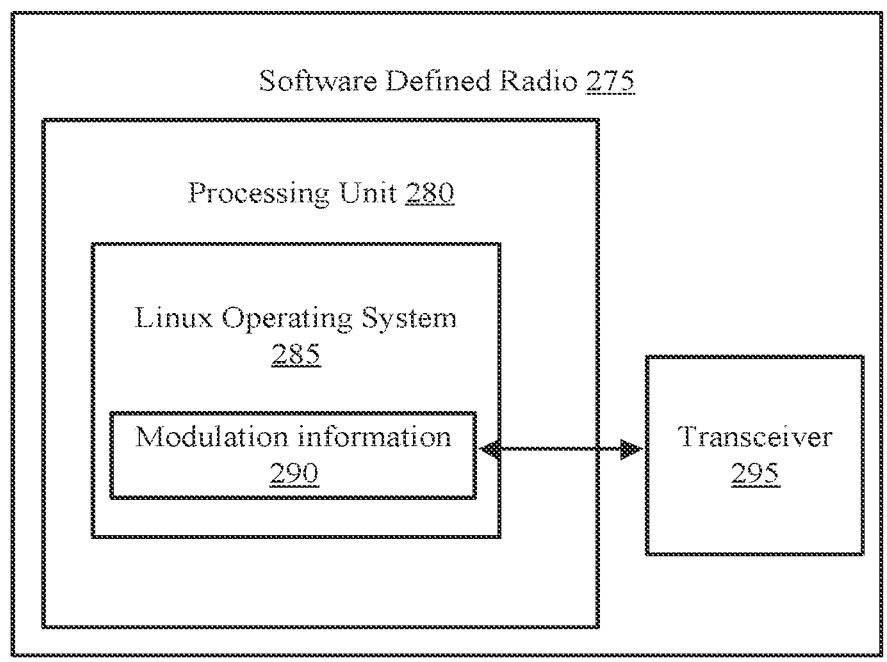
FIGS. 2B and 2C are examples of software defined radios that may be utilized by the communication device of FIG. 2A.

Referring now to FIG. 2B, a more specific example of a software defined radio 275 may include processing module 205 and/or memory 210. In some aspects, the software defined radio 275 may include one or more aspects of computing element 105 and RF element 110 described above in reference to FIG. 1. The software defined radio 275 may include a processing unit 280, such as a Xilinx Zynq-7000 series Programmable System on Chip, which may host a Linux operating system 285 including modulation and other signal conditioning information 290, which may define various processing required to implement various modulation schemes. The processing unit 280 may interface with a transceiver device 295, such as an Analog Devices RF Agile Transceiver Analog Devices 93xx. The transceiver 295 may process and convert commands from the operational software into radio frequencies modulated, demodulated and controlled by the operating software.

In implementations that utilize the ADI93xx device, additional software may be implemented to tune and scale the ADI93xx card outside published operating parameters, for example, to a 5 KHz bandwidth to use for ultra-narrowband channels.

Figure 2C:
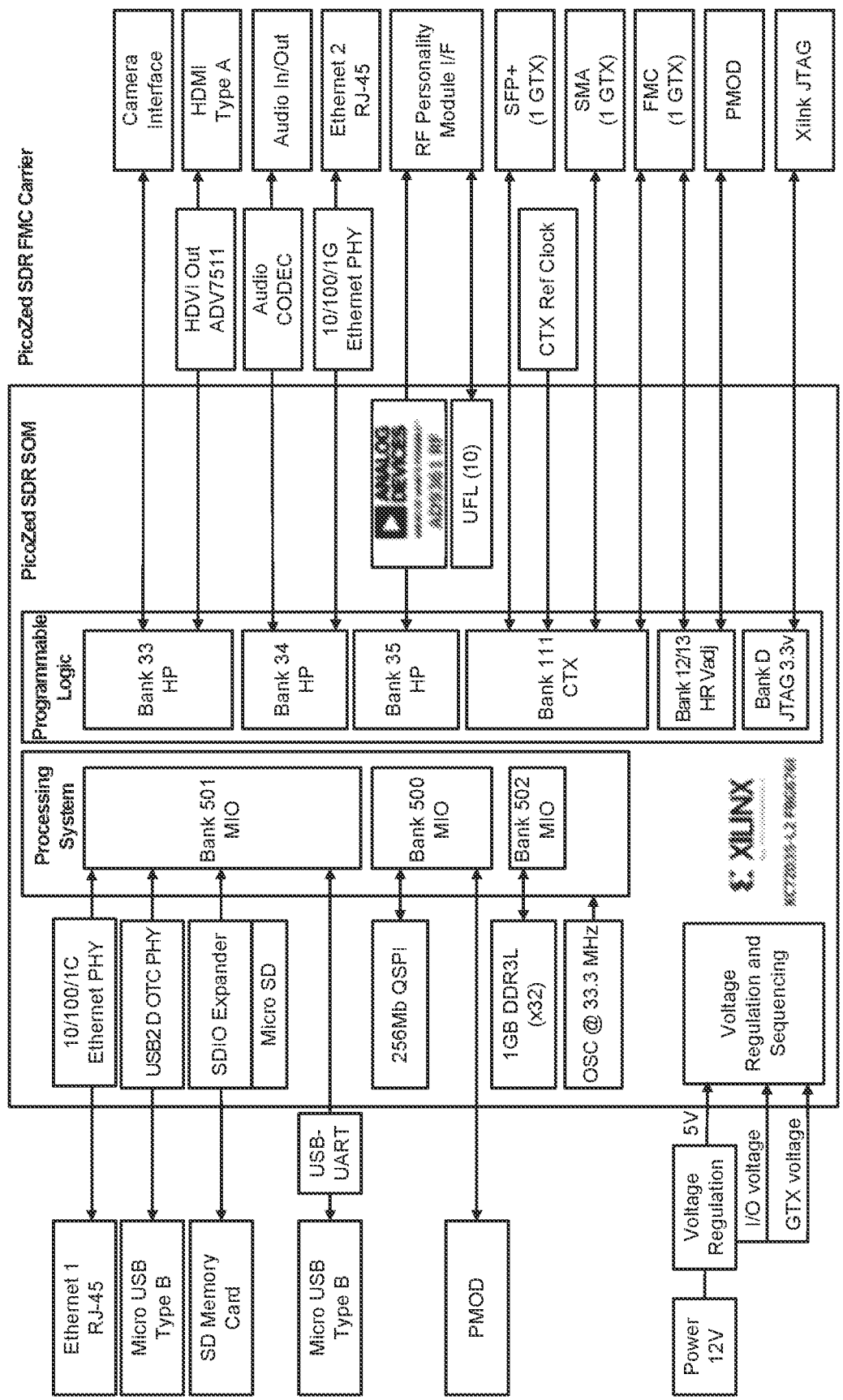

Referring now to FIG. 2C, example connections between the processing unit 280 and the transceiver 290 of FIG. 2B are represented. It should be appreciated that FIG. 2C is only provided by way of explanation. Other hardware devices and different connections of such devices are contemplated herein to build a communication device capable of communicating over selectable frequencies using a software defined radio.

Other software defined radio solutions can be achieved through the use of other hardware. Example potential hardware components include Ettus Radio, XetaWave, and GE MDS Software Defined radios. XetaWave and GE radios make use of a different architecture other than the Analog Devices AD93xx series. This limits their performance envelope to sizes much lower than what is offered in the Analog Devices AD93xx parts. The Ettus radio lacks onboard processing module, and power amplification. These function play a role in achieving the design parameters of the software defined radio described herein, so these alternative hardware components may require combination with additional hardware elements.

Figure 3:
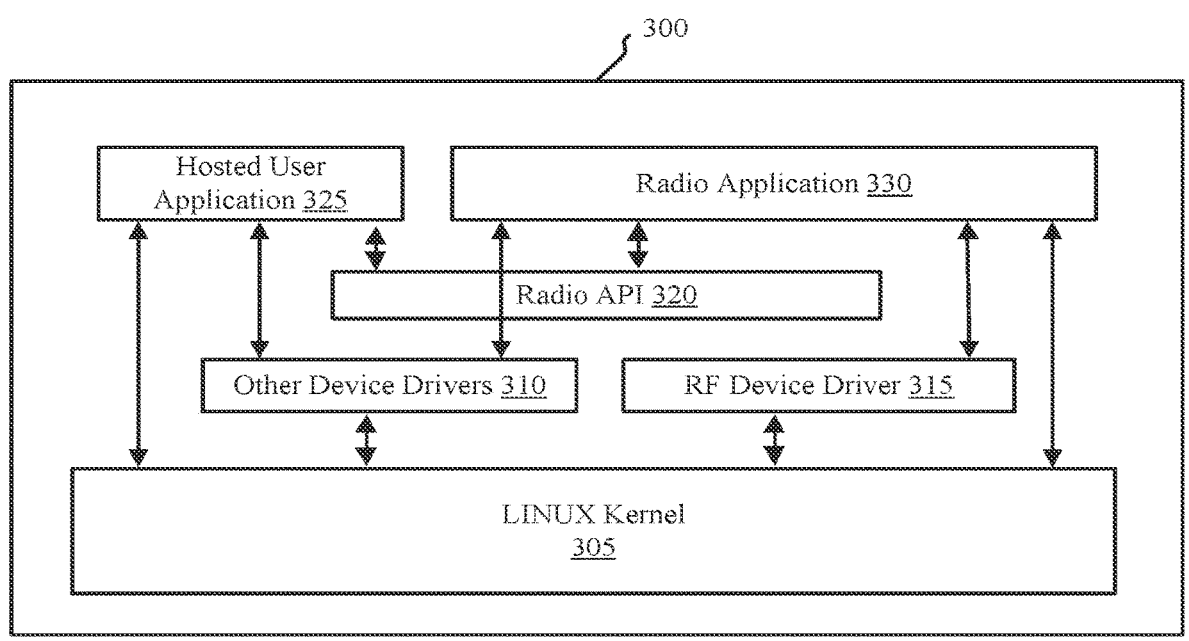
FIG. 3 is a block diagram of a software architecture that may be implemented by the communication device of FIG. 2A, the software defined radios of FIGS. 2B, and 2C, or both.

Referring now to FIG. 3 an example software block diagram 300 illustrates a process that may be executed by computing element 105, RF element 110, processing module 205, and/or software defined radio 275 as described above to implement a software defined radio, and/or may be stored in memory 210. As described below, software or data structure 300 may be implemented in a Linux environment. However, it should be appreciated that similar functionality may also be implemented via other operating systems, such as Windows, iOS, etc.

The software block diagram 300, which can be implemented by the PicoZed System On Module (SOM), includes four distinct software levels or "layers". Listed from the bottom up, the layers include the Kernel Level Kernel Layer, 335 the Device Driver Layer 340, the Application Programming Interface (API) Layer 345, and finally, the Application Layer 350.

The Kernel layer 335, which may include a Linux Kernel 305, contains the operating system and provides the lowest-level abstractions of the physical hardware devices. The Kernel 305 provides the privileged access to block and register-level functionality of the base hardware.

The device driver level 340, which can include an RF device driver 315 and may include other device driver(s) 310, provides device-level abstractions that are particular to the specific devices they service. The device drivers 315, 310 expose the operations and data of a specific device to the upper software layers as well as maintain device state information for both internal, and upper-layer use.

The third layer is the Application Programming Interface (API) layer 345, which includes a Radio API 320, provides some higher-level abstractions to various lower-level drivers and system-level (Kernel-level) resources, but is logically-grouped in a manner that is convenient for a given application. The API level 345 presents an organized grouping of functionality for a given purpose to the Application Layer 350 so that the application logic does not have to be convoluted by the lower-level device and I/O code.

Finally, there is the Application Layer 350, which may include a hosted user application 325 and a radio application 330. The application layer 350 contains the high-level organization, business logic, runtime parameters, data structures and user I/O of the top-level program. It is this top-level program that manages the sequence of events that make up the desired operation of the software.

The software block diagram 300 defines a software application that can follow an open cascade architecture where each layer can make function calls into, and receive data & return values from, any of the layers beneath it. It is not necessary, for example, for the radio application 330 to make function calls into the API 320 in order to access System Functions within the Kernel 305. The application 320 can call these functions directly.

The software structure 300 provides modularity in the different software layers, which allows software to be independently developed and updated based on customer needs without the need of an entire system update. This modularity may enable the development of additional software and functionality that may be added and integrated to the existing software with little modification to the rest of the system, with reduced risk of debilitation at time of update, or both. The software structure 300, while not enforcing a strict interface to the application layer, also provides the benefit of keeping function call overhead to a minimum, especially in high-repetition, processing-intensive environments such as wireless communications.

Figure 4:
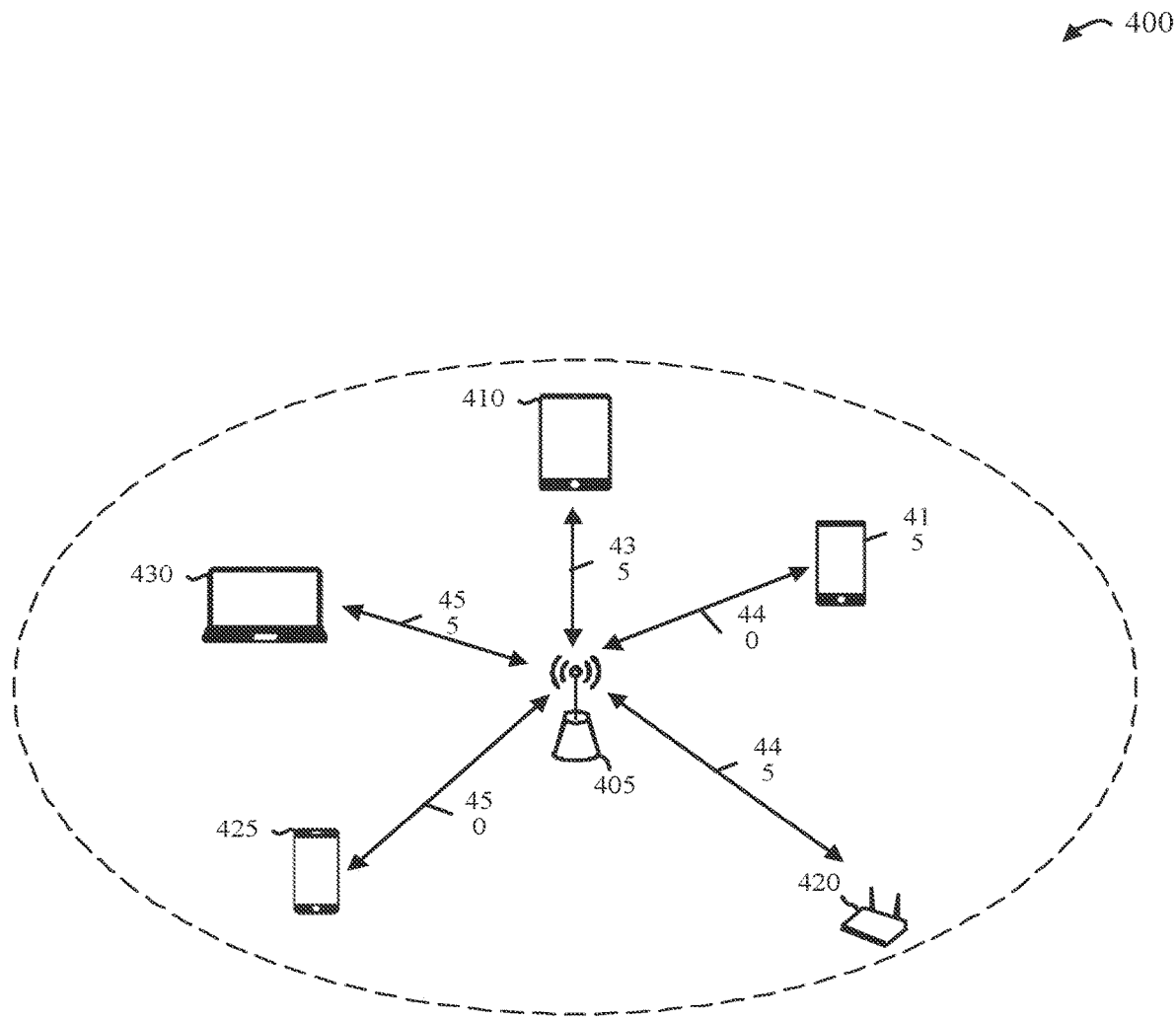
FIG. 4 is a diagram of an example system including the communication device of FIG. 2A in communication with other devices.

Referring now to FIG. 4, in some embodiments, a communication system 400 includes a communication device or software defined radio 405 and a variety of other devices. The communication device 405 may be an example of any of communication devices 100, 200, and/or implement one or more aspects of the software defined radio 275, as described above. Communication device 405 is an example of a radio that is configured to be a mobile radio and/or an accessory device to another device, such as a smart 415 phone, tablet 410, microcontroller 420, or other computing device 425, 430. Near field communications interfaces such as Bluetooth, Wifi, USB, Ultra Wide Band, and other wire/wireless formats 435, 440, 445, 450, 455 may be used to connect communication device 405 to other devices 410, 415, 420, 425, 430 in an effort to extend communication capabilities to beyond just those formats available within the other devices hardware capabilities. Unpublished proprietary type formats may be adopted as required via the radio's software-defined capabilities.

In some aspects, communication device 405 may link with other devices 410, 415, 420, 425, 430 to utilize the capabilities of the other device. This may include providing a graphical user interface via the other device for control, configuration, access, etc., to the communication device 405. In some aspects, communication device 405 may utilize communication capabilities of the linked device 410, 415, 420, 425, 430 to send data via another communication channel, for example, when the communication device 405 is out of communication range of the intended recipient.

In some aspects, communication device 405 may link with another device 410, 415, 420, 425, 430 to utilize other resources of the other device, such as processing power, memory, other device interfaces, and so on. In one example, communication device 405 may be placed near an existing repeater device or computing device that does not support communication over a desired frequency spectrum, such as 220-222 MHZ. In supervisory control and data acquisition (SCADA) applications, for example, the communication device 405 may interface with the existing device to obtain desired information, such as equipment measurements, environmental measurements or other data to be collected by the existing device (either directly or indirectly, in the example of a repeater device or control station that collects information from remote sensors). The communication device may then relay the obtained information using the 220-222 MHZ spectrum, such as over one or more ultra-narrowband channels, to relay the data using a repeater network and/or the internet, to an intended recipient. In this way, the described adjustable software defined radio technology may be used to enhance existing technologies.

In another example, a communication device 405 may be used to gather information from an existing legacy communication network, such as one operating on the 220-222 MHZ spectrum. The communication device 405 may then relay that information to a repeater, which may send the information to an intended recipient via an internet backhaul. Various network structures in which the described adjustable software defined radio may be implemented will be described in greater detail below in reference to FIGS. 7A-7I.

In yet another example, communication device 405 may interface with another device 410, 415, 420, 425, 430 to utilize the processing and memory capabilities of the other device, such as done by the Ettus radio. In some cases, such as where voice is transmitted using ultra-narrowband channels, trunking data may be processed by the other linked device. In yet some examples, the communication device 405 may get updates to software via linking to another device 410, 415, 420, 425, 430.

Figure 5:
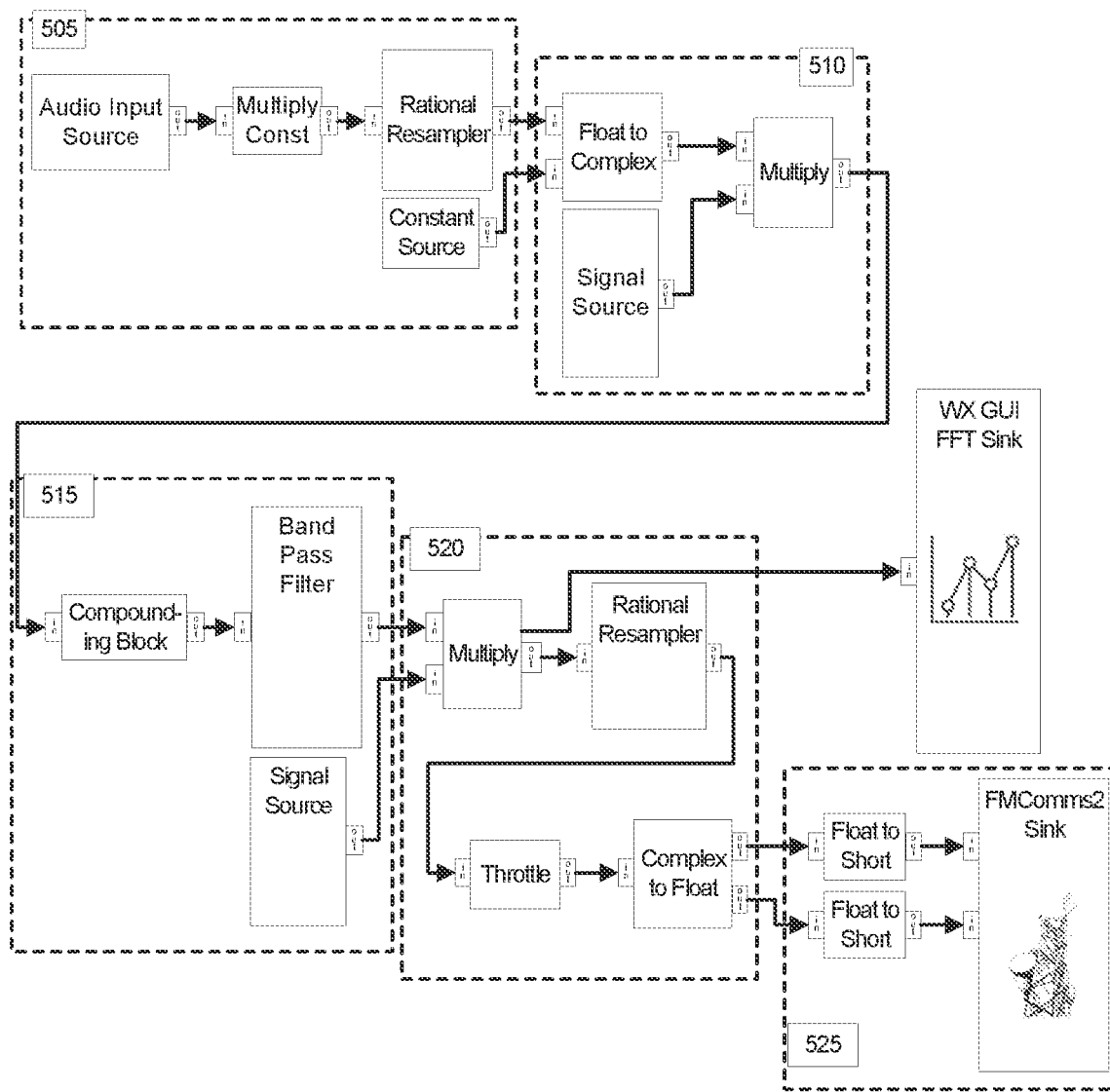
FIG. 5 is a block diagram of an example process by which information is processed and converted from digital information to radio transmissions by the communication device of FIG. 2A.

Referring now to FIG. 5, an example process 500 of acquiring and conditioning the input data, in this case, audio input, is illustrated. This can be audio from a microphone, a file, an auxiliary input, or any other data that can be represented/approximated as a stream of rational numerical values, and may be received at operation 505. This data then moves into block 510 where it is modulated, and then, in this case, compressed to the desired bandwidth allocation at block 515. The operations of blocks 510 and 515 are, in some cases, software-selectable by the user at run-time allowing not only for various modulation schemes at different locations within the radio spectrum, but also various bandwidth allocation within that spectrum. Next, block 520 provides for the conversion from complex numeric values, which are the product of the modulation process, to the paired Real & Imaginary i and q components that are native to the radio hardware. The radio transceiver hardware may then accept these converted values for broadcast, at block 525.

Figures 6A, 6B:
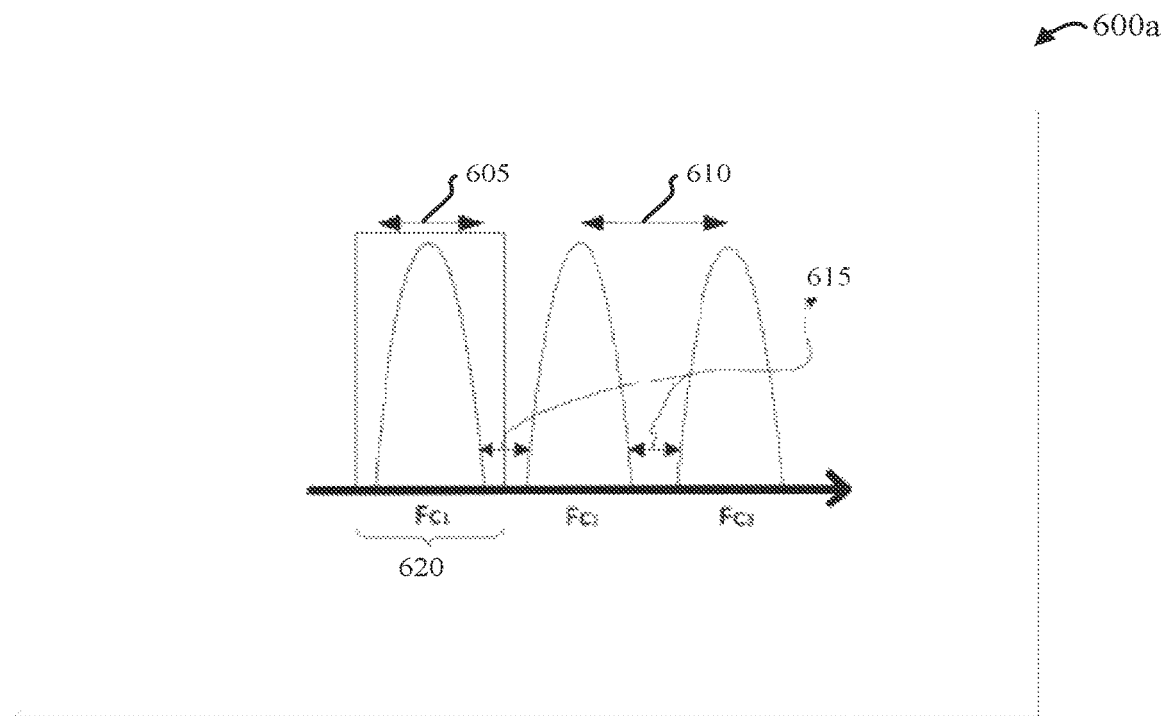
FIG. 6A-6C is a diagram of an example frequency spectrum in which the communication device of FIG. 2A may operate.
Figure 6C:
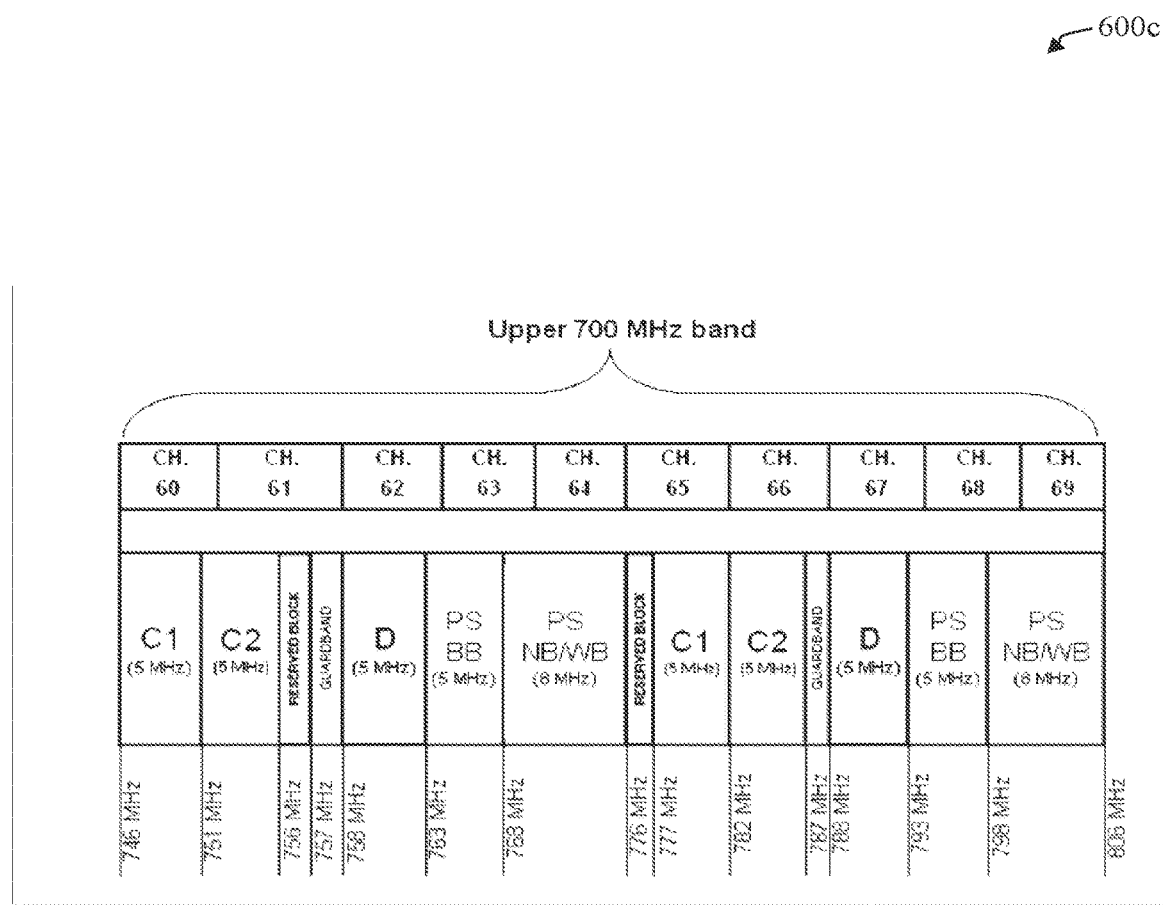

FIG. 6A-6C is a diagram of an example frequency spectrum in which the communication device of FIG. 2A may operate.

Referring now to FIG. 6A, example frequency spectrum 600a includes three channels FC1, FC2, FC3. Each channel may occupy a certain bandwidth, indicated via 605, and be separated from other channels by channel separation 610, each defined in terms of frequency. In between each channel, a guard band 615 may be provided in which no data is communicated, to, for example, minimize interference between different channels. 620 may represent the frequencies by which a communication device will allow to pass through a band pass filter in order to receive data communicated via the channel's bandwidth 605.

Referring now to FIG. 6B an example of an ultra-narrowband frequency channel 600b is shown, which may be an example of one of channels FC1, FC2, FC3, as described above in reference to FIG. 6A. The operational band 630, which in this example is 4 KHz, may contain the data to be communicated across the channel. The operational band 630 may have, on either side, guard bands 625, 635, which in this example are 500 Hz. The guard bands may further help to reduce interference, distortion of the data, or both, contained within operational band 630 due to nearby communication channels. As described above, an adjustable software defined radio may be configured to transmit data within the operational band 630 of an ultra-narrow channel 600b. In these scenarios, the data may be modulated according to ACSB techniques, which have been described elsewhere.

Referring now to FIG. 6C, a diagram 600c illustrates characteristics of the upper 700 MHZ frequency spectrum of a given network. The 700 MHz band has two 1 MHz stop bands at 757 MHz and 787 MHz. The FCC has made a ruling that states stop bands may be used as public band space as long as the elements transmitting in the stop band to not interfere with surrounding transmissions. Given a theoretical stop band of 1 MHz size at 757 MHz, 1 MHz=1000 kHz, and 1000 kHz divided by 6.25 kHz (the size of a single narrowband channel including guard bands) =160 different channels. That same calculation performed for 5 kHz channels=200 channels. Therefore, it can be deduced that a network of 160 ultra-narrowband channels can fit within the currently unused guard band in the 700 MHz spectrum. If this is taken one step further, there is a second guard band at 787 MHz which could also be utilized providing a total of 320 ultra-narrowband channels. This illustrates an example of how ultra-narrowband communications can be utilized in guard bands to make use of underutilized spectrum. These guard bands exist throughout all spectrum administrated by FCC and other organizations. Furthermore, the bandwidth of a single channel can be increased where 5 kHz does not offer enough bandwidth for the intended application. This configurability allows for great flexibility in the defining of a network architecture as bandwidth can be configured to be uniform or more uniform across a specific spectrum or offer high bandwidth and low bandwidth channels based, for example, on the user needs.

FIGS. 7A-7H illustrate example network configurations in which the communication device of FIG. 2 may operate.

Figure 7A:
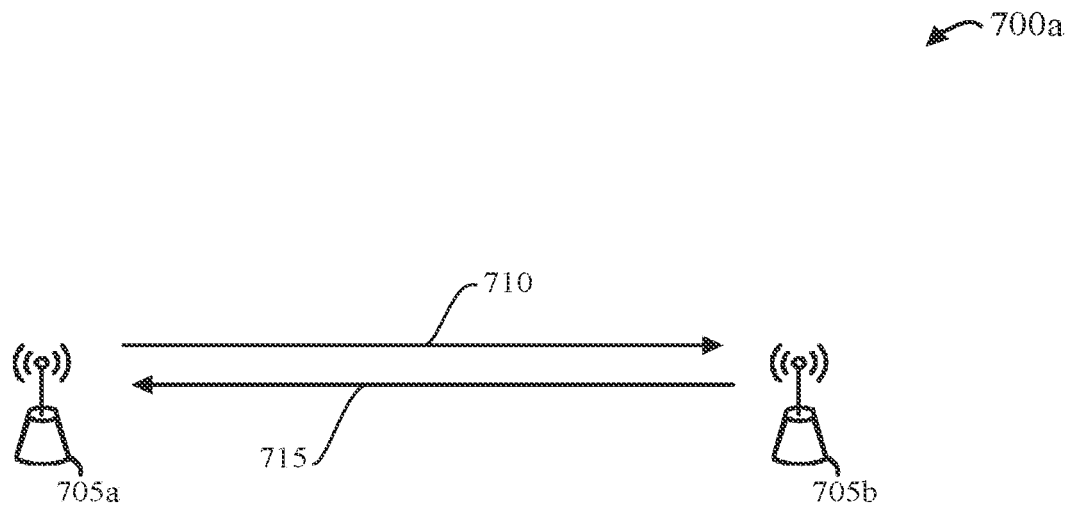
FIG. 7A-7I are diagrams of example network configurations in which the communication device of FIG. 2 may operate.

Referring now to FIG. 7A a point-to-point network 700a is illustrated, including two radios or communications devices 705a and 705b in direct communication with each other via transmit and received channels 710 and 715. In some aspects, one or more of radios 705a and 705b may adjust the frequency or channel 710, 715 at which they communicate with the other of the radios 705a and 705b and/or the bandwidth of the communication channel based on a number of factors, for example, utilizing a software defined radio, as described in more detail above.

Radios 705, and repeaters 720 as described in FIGS. 7A-7I, may incorporate one or more aspects of communication devices 100, 200, or both, and/or may implement the software defined radio 275, software 300, or both. In some aspects, each radio 705 may provide an interface for inputting one or more of frequency/channel parameters, bandwidth parameters modulation parameters, power parameters, and/or data schema for point-to-point networking. In some aspects, radios 705 may support SCADA text/data communications for point-to-point networking.

Figure 7B:
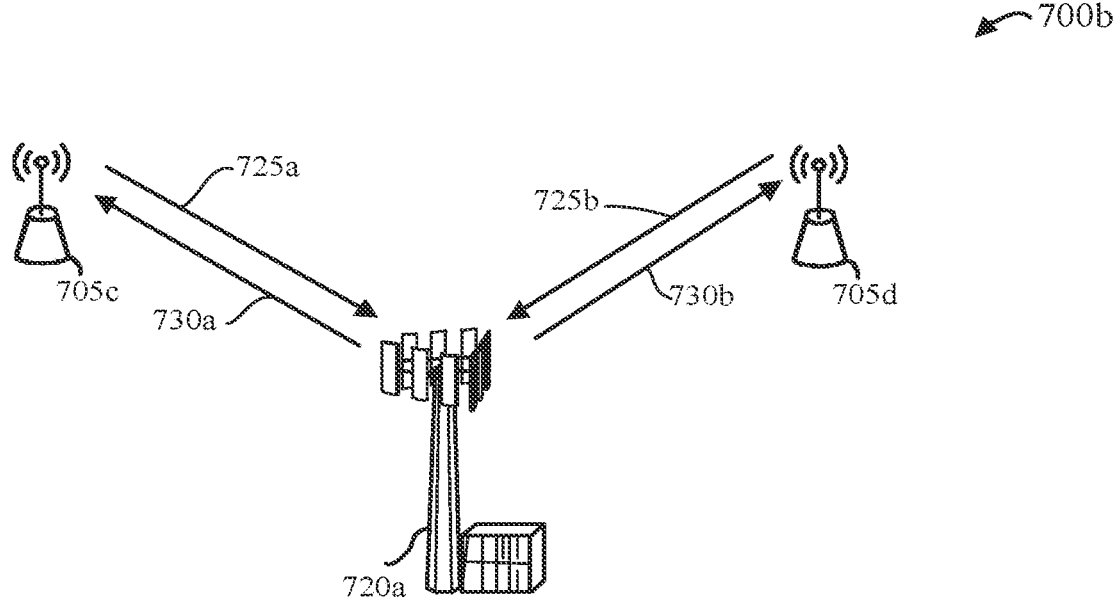

Referring now to FIG. 7B a fixed repeater network 700b is illustrated in which two radios or communication devices 705c and 705d communicate through a repeater device 720a. The repeater device 720a may extend the reach of traditional point to point networks. Repeaters 720 are typically high power radios placed in strategic locations such as on hilltops or towers with the intent of extending the range of communications beyond that which can typically be achieved with low power, point to point networks. Repeaters 720 are typically setup to support a variety of connections between and across different channel groups and interested parties. As illustrated, radio 705c may transmit and receive data over channels 725a and 730a. To reduce interference, radio 705d may transmit and receive data on different channels 725b and 73 0b.

In some aspects, each repeater 720 may provide an interface for inputting one or more of frequency/channel parameters, bandwidth parameters modulation parameters, power parameters, and/or data schema for point-to-point networking. In some aspects, repeaters 720 may support SCADA text/data communications for repeater networking. In some cases, radios 705 may support repeater applications where signals are sent to the repeater 720 on one frequency and rebroadcast on another frequency to the network.

Figure 7C:
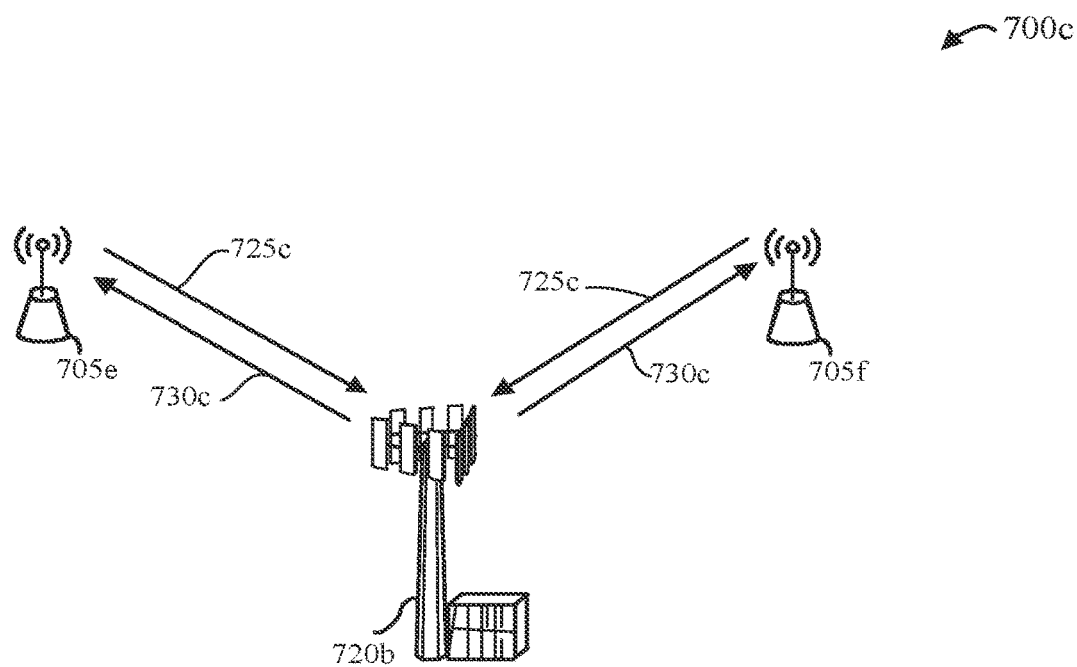

Referring now to FIG. 7C a fixed repeater network 700c is illustrated in which two radios or communication devices 705e and 705f communicate through a repeater device 720b using the same transmit and receive frequency channels 725c and 730c. In some cases, operation on the same frequency for multiple devices 705 by the repeater 720 may be accomplished via timing control methods known to those of skill in the art (e.g., TDMA), such as by delay transmission over two transmit or receive channels by a configurable time period.

Figure 7D:
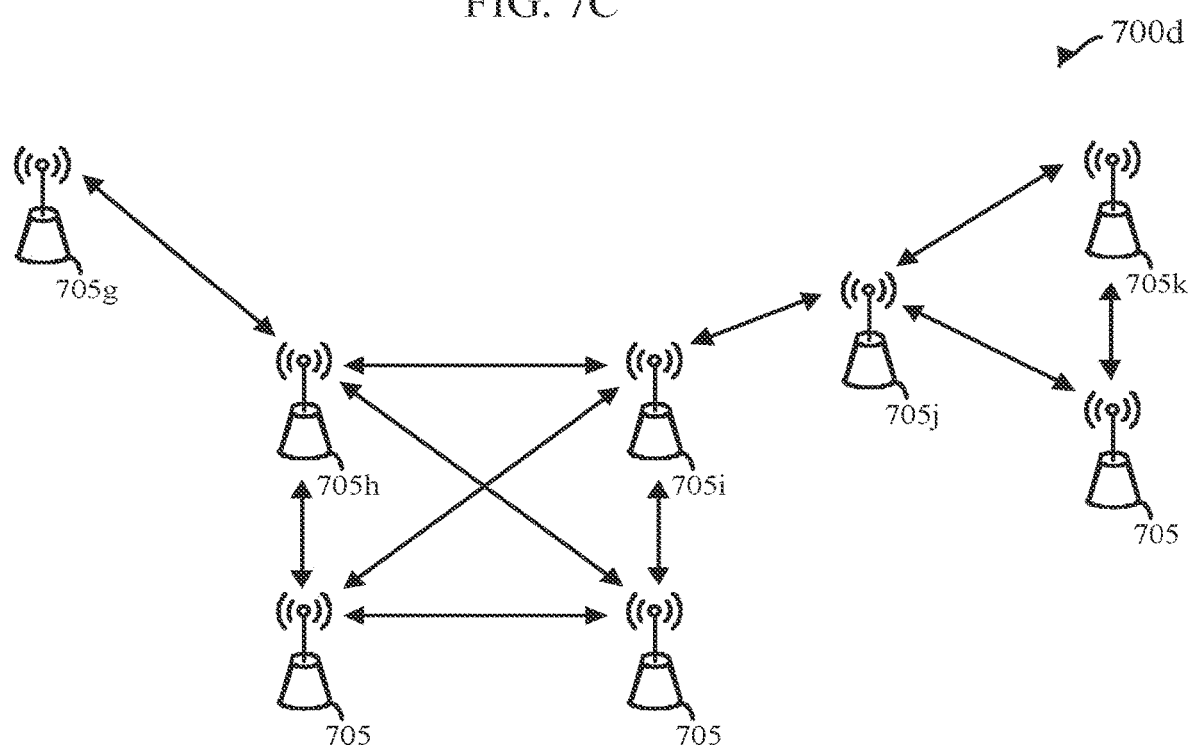

Referring now to FIG. 7D, a mesh network 700d is illustrated including multiple radios 705. The mesh network 700d may operate via each radio relaying data for the network, for example, until it reaches its intended recipient. Each radio 705 may cooperate with other radios 705 to distribute data through the network 700d, for example, via flooding of routing techniques.

Mesh networks can relay messages using either a flooding technique or a routing technique. With routing, the message is propagated along a path by hopping from node to node until it reaches its destination. To ensure all its paths' availability, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically reliable, as there is often more than one path between a source and a destination in the network. Although mostly used in wireless situations, this concept can also apply to wired networks and to software interaction.

A mesh network whose nodes are all connected to each other is a fully connected network. Fully connected wired networks have the advantages of security and reliability: problems in a single connection affect only the two nodes attached to it. However, in such networks, the number of connections and therefore the cost, goes up rapidly as the number of nodes increases. Mesh networks can be considered a type of an ad-hoc network. Thus, mesh networks are closely related to mobile ad hoc networks (MANETs), although MANETs also must deal with problems introduced by the mobility of the nodes.

Referring now to FIG. 7D, potential communication path between mobile radio 705g and mobile radio 705k is illustrated. Communications are achieved by utilizing mobile radios 705h, 705i, and 705j to repeat the traffic and extend the network to service a connection between mobile radios 705g and 705k. This network architecture is often referred to as mesh network architecture.

Figure 7E:
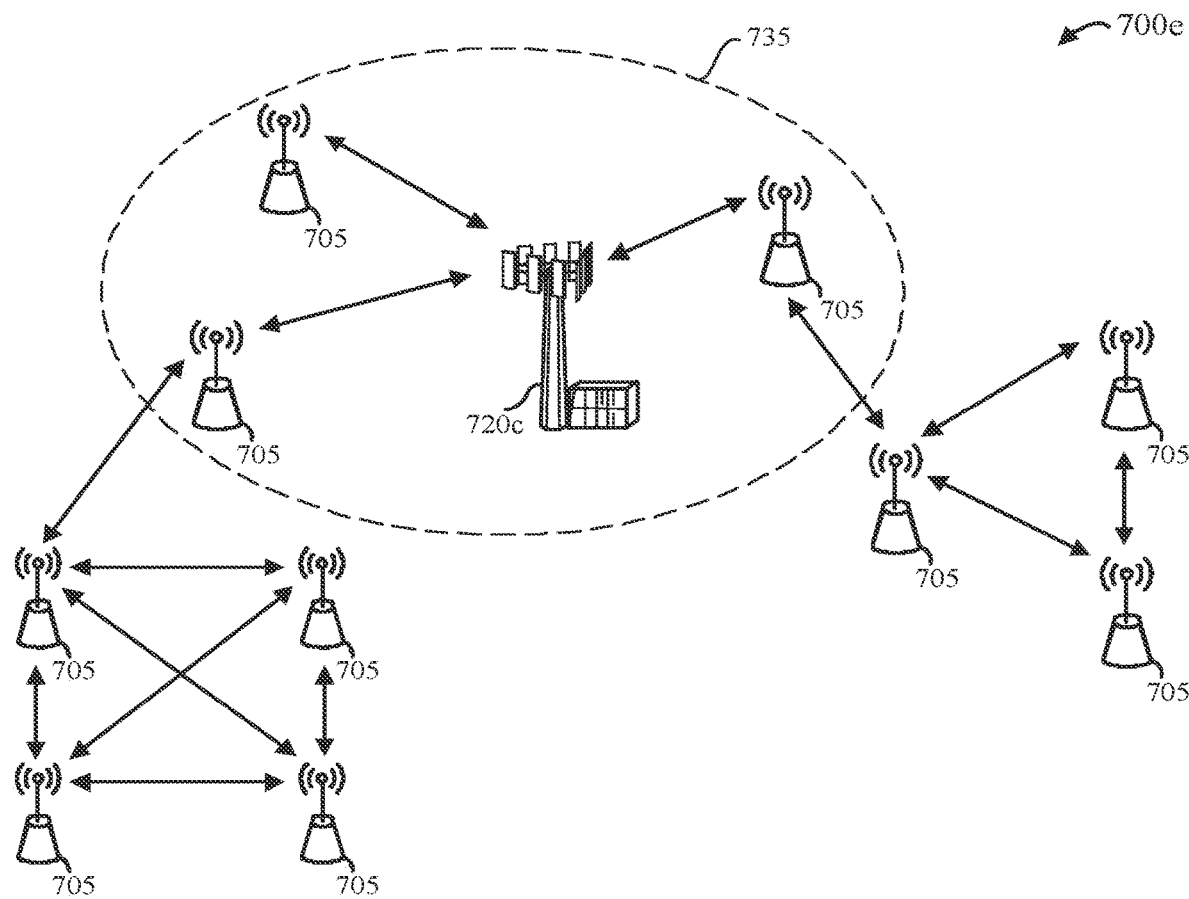

Referring now to FIG. 7E, an example of a hybrid mesh network 700e is illustrated. In some aspects, communication devices 705 and repeater 720c may support Hybrid Mesh Networking topologies. Hybrid mesh networking involves the use of traditional repeater hub 720c and spoke networks for close area communication while utilizing point-to-point mesh networks for surrounding areas not in the repeater coverage area 735. The hybrid mesh network takes full advantage of the repeater network when radios 705 are within the repeater coverage 735. Radios 705 outside the repeater coverage area 735 are normally able to utilize one or more other radios 705 to network and backhaul information. The result is a strong redundant network that is tolerant of outages while providing increased communication efficiency through the use of traditional repeater networking and advanced mesh networking connection algorithms.

Figure 7F:
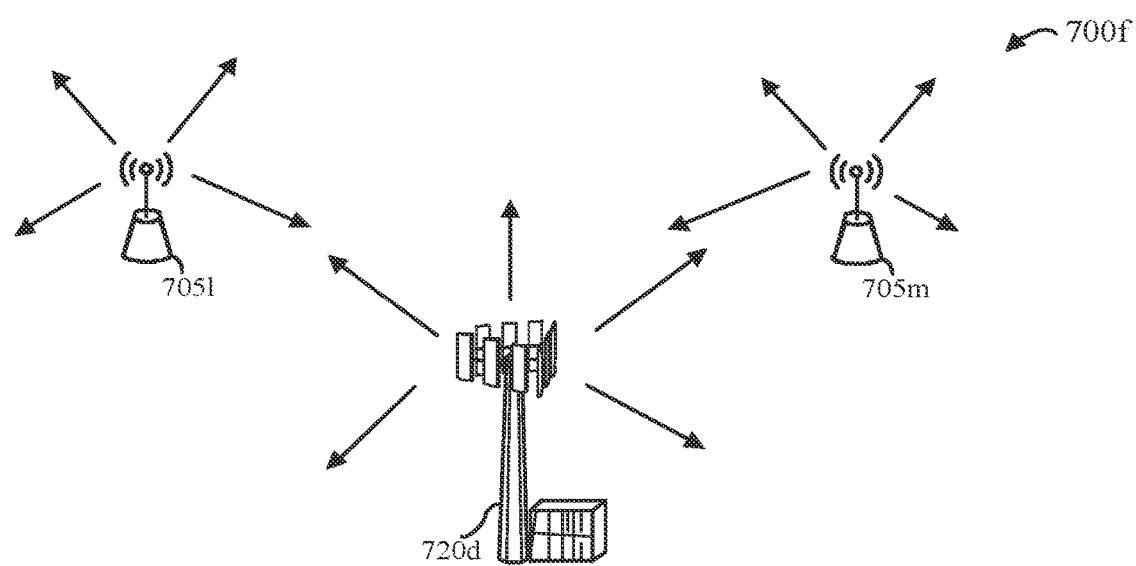

Referring now to FIG. 7F, a communication system 700f is illustrated in which neither radios 705l and 705m or repeater 720d utilize beamforming (e.g., represented by broadcast lines extended from each device in all directions). In some aspects, the software defined radio, such as radio 705, may be capable of utilizing beamforming.

Beamforming or spatial filtering is a signal processing technique used in sensor arrays for directional signal transmission or reception. This is achieved by combining elements in a phased array in such a way that signals at particular angles experience constructive interference while others experience destructive interference. Beamforming can be used at both the transmitting and receiving ends in order to achieve spatial selectivity. The improvement compared with omnidirectional reception/transmission is known as the directivity of the element.

A typical non-beamforming network is illustrated in FIG. 7F. In this network radio waves are sent with no directionality in an effort to get a uniform beam. While this method offers uniform transmission areas it broadcasts power to both areas that require it, as well as areas that have no radio endpoints. As a result, power is sometimes expended to send radio waves to areas where there are no endpoints to decode or make use of them.

Figure 7G:
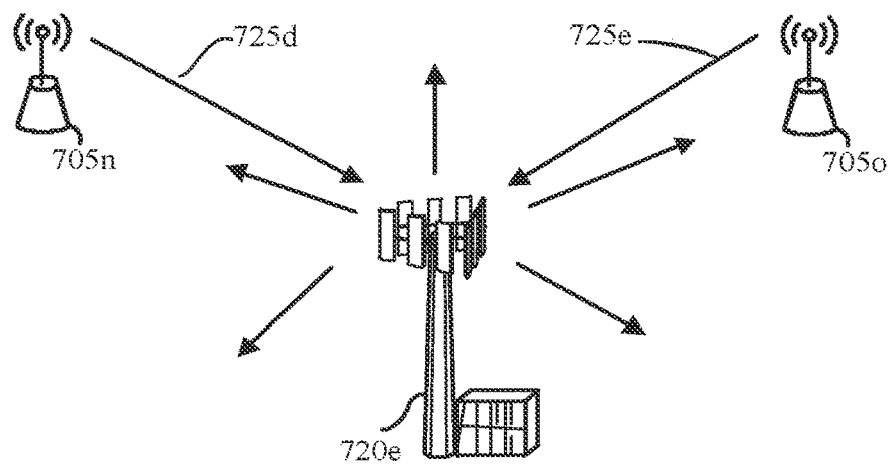

Referring now to FIG. 7G, a communications network 700g is illustrated in which radios 705n and 705o utilize beamforming. In a mobile beamforming network, the mobile radios 705n and 705o have the capability to utilize beamforming in an effort to conserve power and maximize transmission distances. In this network, the mobile radios 705n and 705o focus their power in the direction of the repeater 720e via transmit channels 725d and 725e. This can allow for a more efficient use of power and can lengthens transmission distances through the use of focused power. A side effect of this is lower spectral noise as the mobile radios 705n and 705o transmit only in the direction of the repeater.

Figure 7H:
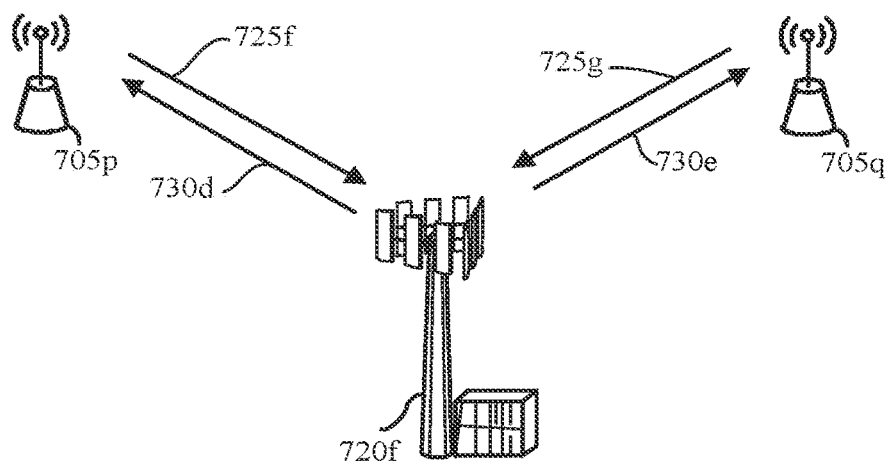

Referring now to FIG. 7H a communications network 700h is illustrated in which radios '705p and 705q and repeater 720f both utilize beamforming. In a mobile and fixed beamforming network, all radiating elements including both repeater 720f and mobile radios 705p and 705q make use of beamforming via transmit and receive channels 725f, 725g and 730d, 730e, to maximize power output and spectrum usage. In this network, all radiated emissions are directed towards their intended recipient. A side effect of this type of network is enhanced security. This is due to the need for someone to be within the beam path to intercept communications, which adds additional level of variability increasing the difficulty of intercept.

Figure 7I:
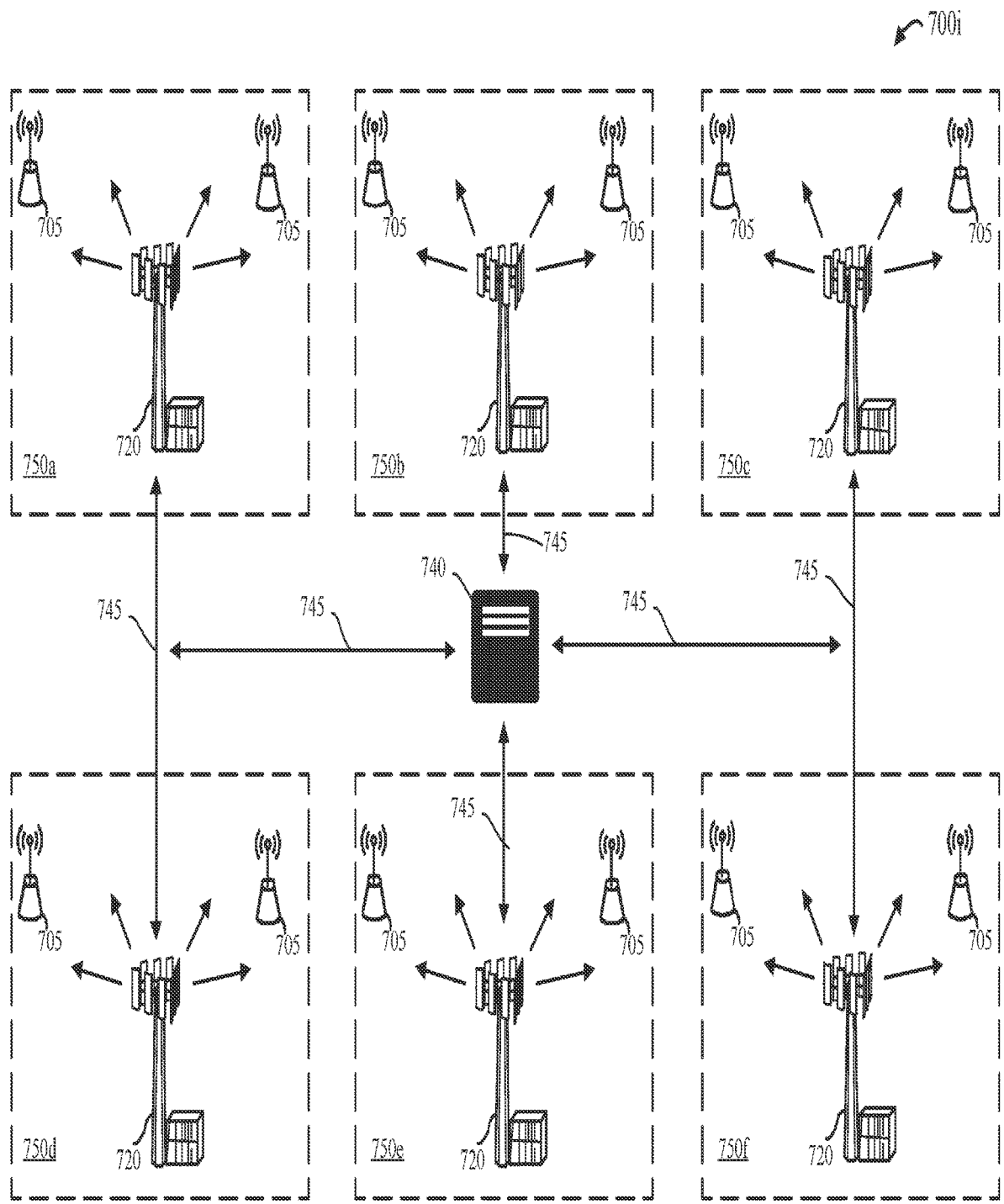

Referring now to FIG. 7I a communications network 700i is illustrated in which radios 705 and repeater 720, with the optional addition of a communication server 740, implement a large area network (e.g., a nation-wide network). As illustrated, six different repeaters 720, each having a separate coverage area 750a, 750b, 750c, 750d, 750e, 750f, may communicate with various radios 705 that may otherwise be out of communication range to communicate directly with each other. In some cases, each repeater 720 may communicate with other repeaters 720 via another communication link, such as an internet backhaul 745. The repeaters 720 may form a network and may perform routing functions and other such functions collectively. In some cases, the system of repeaters 720 may store prior connection information, may associate certain radios 705 with certain coverage areas 750/certain repeaters 720, and so on. By utilizing a backhaul 745, transmissions on one network can be sent to another network in a different areas, such as geographical areas. allowing for nationwide coverage through interconnect of repeaters 720.

In some aspects, one or more communication servers 740, or other computing devices, such as cloud resources, may be implemented to aid in managing the network 700i. The communication server or servers 740 may implement management functions across the network 700i, such as managing connection information, coverage area information routing information, and the like.

Figure 8:
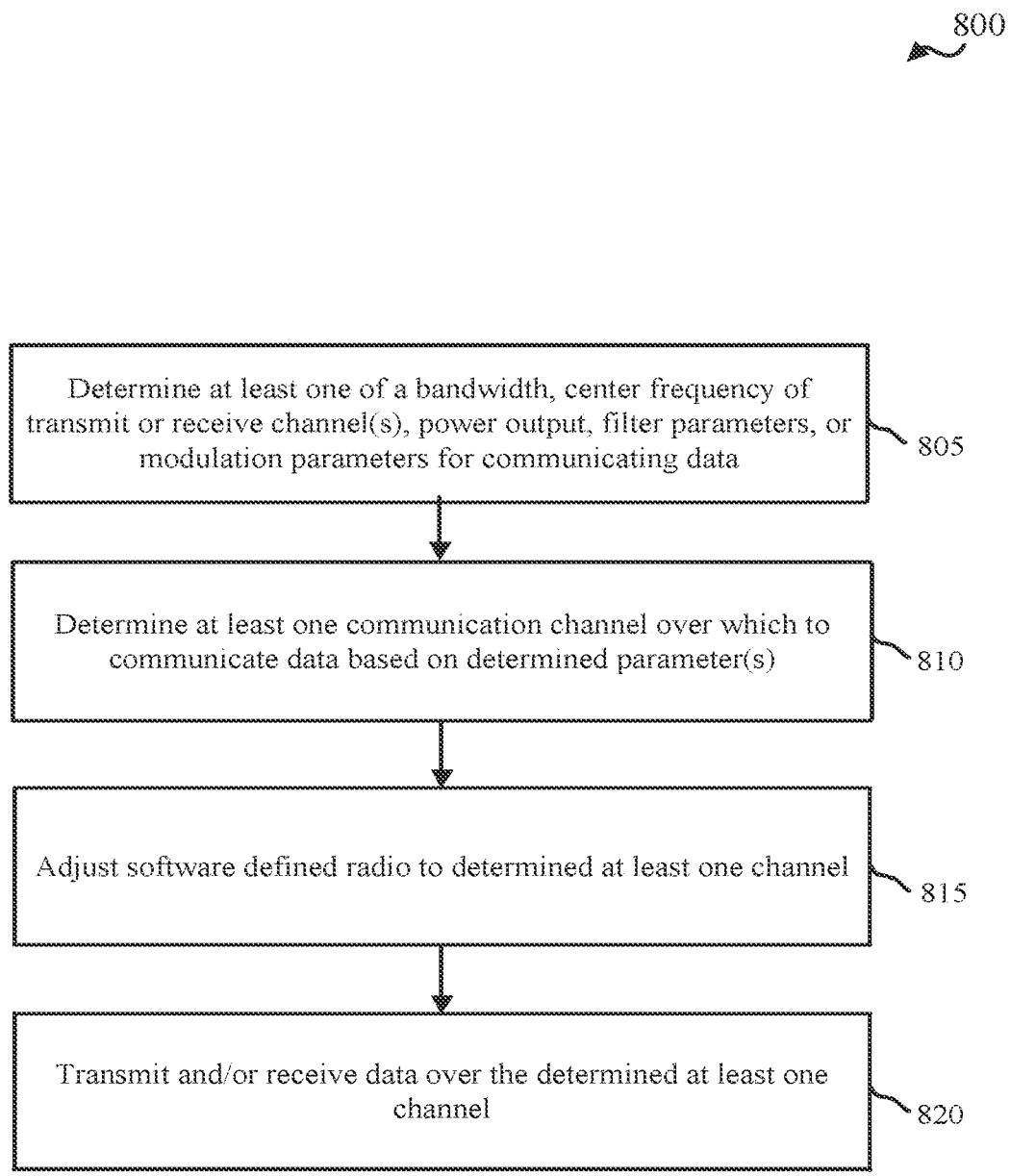
FIGS. 8-9 are flow diagrams of example processes for communicating data using an adjustable software defined radio.

Referring now to FIG. 8 example process 800 for adjusting at least one operational parameter for communicating with another device by a software defined radio is illustrated. Process 800 may be implemented by any of communication devices 100, 200, and/or 705, and/or may implement a software defined radio 275 and/or software 300.

Process 800 may begin with operation 805, in which at least one of a bandwidth, center frequency of transmit or receive channel(s), power output, filter parameters, or modulation parameters for communicating data may be determined. In some aspects, operation 805 may be performed based on one or more of user input, a selection of data to be communicated, a recipient device, available network resources, available spectrum, and/or a number of other factors. In some cases, the filter parameters or characteristics may include the number of poles of the filer, notches, etc.

Next, at operation 810, at least one communication channel over which to communicate data may be determined/selected. In some cases, operation 810 may include determining both a transmit and a receive channel. In some cases, operation 810 may include selecting from a set of known or determined available channels, based on the one or more parameters relieved or determined at operation 805. In some cases, best fit, approximation techniques, and or machine learning may be used to select the one or more channels.

Next, at operation 815, the software defined radio of the communication device implementing process 800 may be adjusted for the selected one or more channels and/or parameters. Operation 815 may include adjusting filter parameters, modulation definitions or parameters, adjusting the data to be communicated over a specified bandwidth, etc.

Next, at operation 820, the data may be transmitted and/or received across the selected one or more channels, according to, at least in part, the determined one or more parameters.

Figure 9:
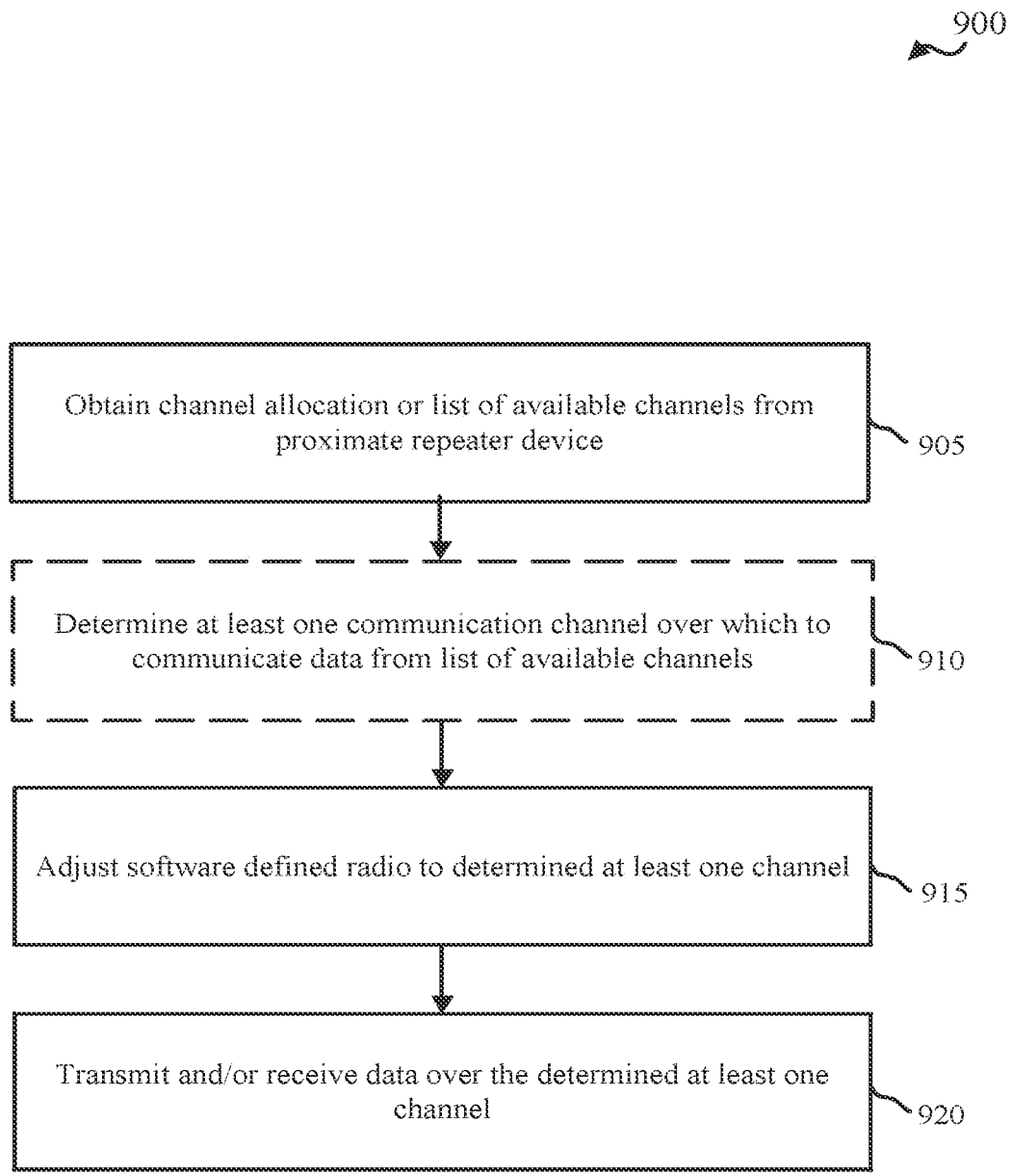

Referring now to FIG. 9 another example process 900 for adjusting at least one operational parameter for communicating with another device by a software defined radio is illustrated. Process 900 may be implemented by any of communication devices 100, 200, and/or 705, and/or may implement a software defined radio 275 and/or software 300. Process 900 may be implemented by a communication device configured to communicate over ultra-narrowband channels, for example, in a network operating in the 220 MHz to 222 MHz spectrum.

Process 900 may begin at operation 905, in which an adjustable software defined radio communication device may receive a channel allocation or a list of available channels from a proximate repeater device, such as a repeater 720. In some cases, one or more repeater devices in a network, such as any of networks 700, may constantly or periodically broadcast channel assignments or allocations. In other cases, once an adjustable software defined radio communication device is within range of a repeater device, it may automatically request a channel allocation from a repeater device or base station.

In some aspects, where the communication device receives a list of available channels, one or more channels may be selected or determined at operation 910. In some cases, operation 910 may include determining both a transmit and a receive channel. In some aspects, operation 910 may include selecting a channel or channels with the least interference, or based on other performance-type metrics.

Next, at operation 915, the software defined radio of the communication device may be adjusted for the selected one or more channels. In some aspects, operation 915 may include processing the data for transmission, and applying ACSB modulation to the data, adding trunking data as needed for data containing voice or audio information, etc.

Next, at operation 920, the data may be transmitted and/or received across the selected one or more channels.

Figure 10:
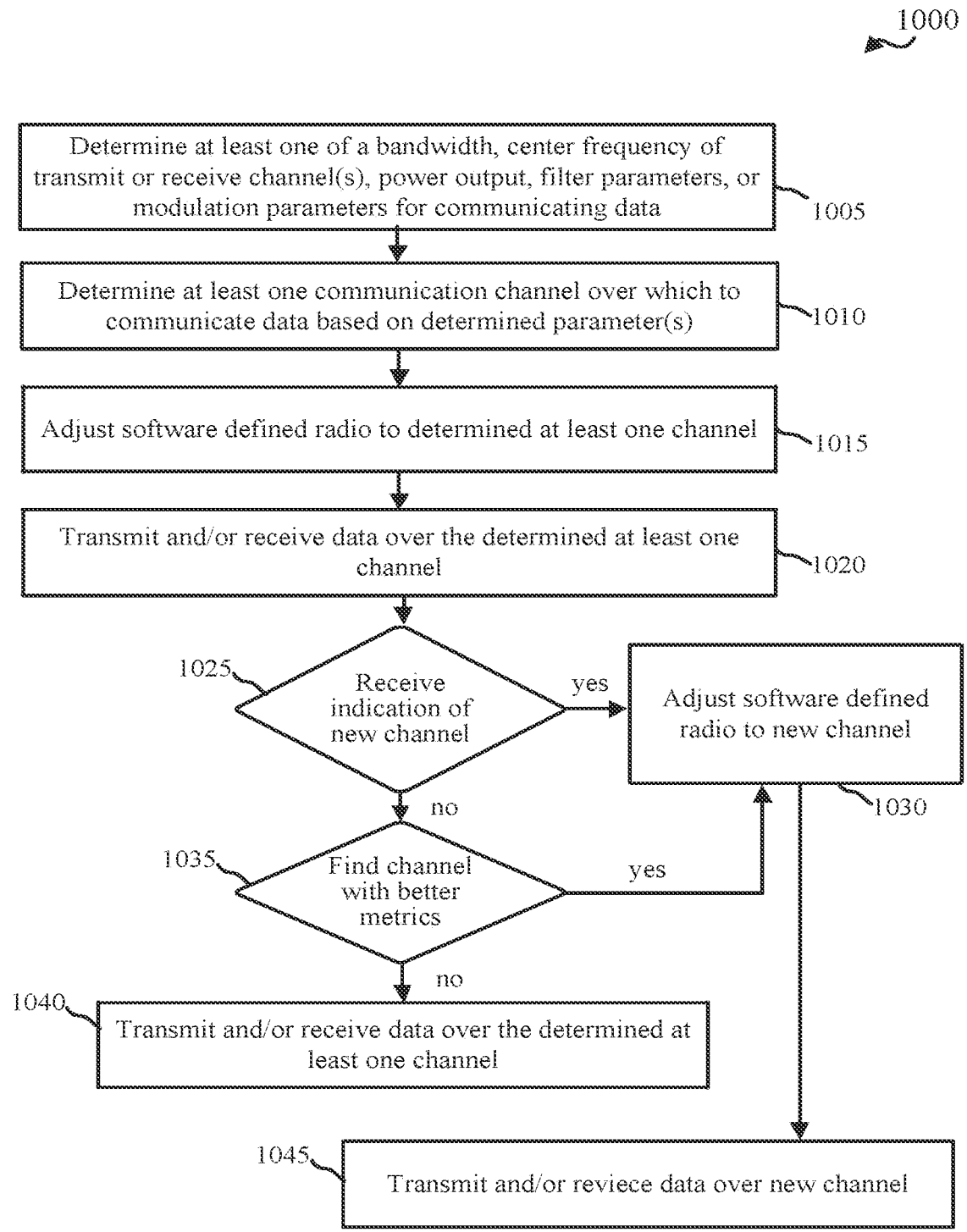
FIG. 10 is a flow diagram of an example process for routing data using ultra-narrowband channels and a second communication protocol.

Referring now to FIG. 10, another example process 1000 for adjusting at least one communication parameter for communicating data with another device by a software defined radio is illustrated. Process 1000 may be implemented by any of communication devices 100, 200, and/or 705, and/or may implement a software defined radio 275 and/or software 300. Process 1000 may be implemented by an adjustable software defined radio communication device also enabled with cognitive radio functionality.

Operations 1005, 1010, 1015, and 1020 may be similar to operations 805, 810, 815, and 820 described above in reference to FIG. 8, and for the sake of brevity will not be described again here. After operation 1020, process 1000 may proceed to optional operation 1025, in which it may be determined if an indication of a new channel has been received. Operation 1025 may include determining if a new channel allocation has been received by the communication device, or may include determining if the current channel is no longer viable. If the determination at operation 1025 is positive, then the software defined radio may be adjusted to accommodate the new channel or channels at operation 1030, and data may be transmitted and/or received over the new at least one channel at operation 1045. If the determination at operation 1025 is negative, process 1000 may proceed to operation 1035.

At operation 1035, it may be determined if a channel with better performance metrics (e.g., less interference), has been identified. Operation 1035 may include scanning for channels within an identified or support spectrum for better performance, greater bandwidth, support for a preferred modulation scheme, and so on. If the determination at operation 1035 is positive, then the software defined radio may be adjusted to accommodate the identified channel or channels, at operation 1030, data may be sent and/or received over the new at least one channel at operation 1045. In this way, the communication device may adapt its transmission and/or reception parameters to utilize the best available channels for communication.

If the determination at operation 1035 is negative, then process 1000 may proceed to operation 1040, where data may be transmitted and/or received over the prior determined channel or channels.

In some aspects, one or more of operations 1025-1045 may be performed constantly while transmitting data, periodically, at set time intervals, or when communication quality goes below a threshold amount, for example. It should be appreciated that in some cases, the trigger event for initiating operation 1025 and/or 1035 may be configurable. In some cases, operation 1025 may be performed upon receiving an indication of a failed communication or from a repeater station.

Figure 11:
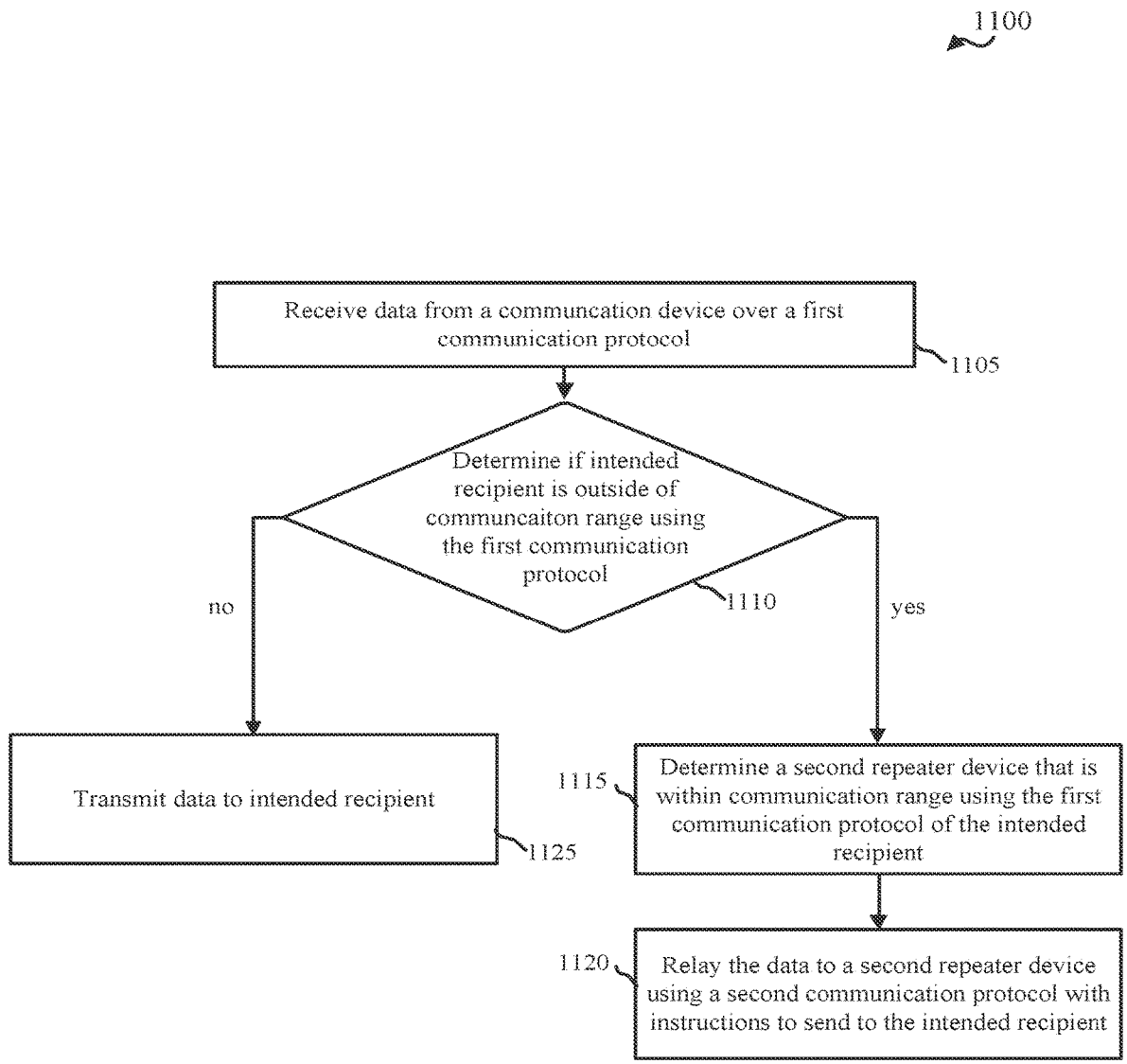
FIG. 11 is a flow diagram of an example process for routing data in a communication network.

Referring now to FIG. 11, an example process for routing data in a communication network is illustrated. Process 1100 may be implemented by any of communication devices 100, 200, and/or 705, repeater device 720, and/or may implement a software defined radio 275 and/or software 300.

Process 1100 may begin at operation 1105, in which data from a communication device may be relieved via a first communication protocol. In some examples, the first communication protocol may be over one or more ultra-narrowband channels (e.g., 5 kHz), within the 220 to 222 MHz spectrum. In some aspects, a repeater device, such as repeater 720 may perform one or more aspects of process 1100.

Next, at operation 1110, it may be determined if the intended recipient is outside of communication range using the first communication protocol. If the determination at operation 1110 is negative, then the data may be transmitted to the intended recipient. In some cases, the data may be transmitted using a different frequency than the frequency or channel that the data was received over. In other cases, the data may be re-transmitted on the same frequency.

If the determination at operation 1110 is positive, then process 1100 may proceed to operation 1115, wherein a second repeater device that is within communication range of the intended recipient using the first communication protocol may be determined. Operation 1115 may include accessing a database or directory, for example, maintained by the network, of the last known location/repeater device within range of the intended recipient. The database or directory may be maintained by the repeater device itself, or be a database updated by various devices, accessible via the cloud. In some aspects, operation 1115 may include communicating with a server or servers that are tasked with maintaining the network.

Next at operation 1120, the data may be relayed to the second repeater device using a second communication protocol with instructions to send to the intended recipient. In some aspects, the second communication protocol may include the internet, over which repeater devices in a network are connected.

Each of the processes, methods and algorithms described in the preceding sections may be embodied in, and fully or partially automated by, instructions, such as those embodied in code modules, and executed by one or more computers or computer processors. The code modules containing instructions may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

A processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list. Unless otherwise noted, the terms "a" or "an," as used in the specification are to be construed as meaning "at least one of."

While certain example embodiments have been described, these embodiments have been presented by way of example only and are not intended to limit the scope of the disclosure. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of certain of the disclosure.

What is claimed is:

1. A communication device, comprising:
   a radio frequency (RF) element; and
   a computing element communicatively coupled to the RF element, the computing element defining a software defined radio, wherein the computing element comprises:
   at least one processor; and
   memory storing executable instructions, that when executed by the at least one processor, configure the communication device to:

select at least two different narrowband or ultra-narrowband channels for transmitting or receiving data;
select and configure, from plurality of options, at least two of modulation or demodulation, companding, mixing, and filtering for communicating signals through programmable logic; and
at least one of transmit or receive data over the at least two different narrowband ultra-narrowband channels using a first communication protocol, wherein the software defined radio is adjustable to operate at any of a variety of different narrowband or ultra-narrowband channels responsive to a frequency band selection, and wherein the software defined radio is adjustable to operate at the selected at least two of modulation or demodulation, companding, mixing, and filtering.

2. The communication device of claim 1, wherein the at least two channels further comprise a plurality of channels, and wherein the instructions, when executed by the at least one processor, further configure the communication device to:
detect a portion of unused spectrum; and
select the plurality of channels within the unused spectrum for transmitting or receiving data.

3. The communication device of claim 1, wherein the communication device comprises a repeater device.

4. The communication device of claim 1, wherein the RF element comprises a transceiver, wherein the transceiver is configured to:
communicate via a second communication protocol with a second communication device.

5. The communication device of claim 4, wherein the second communication protocol comprises at least one of Bluetooth, Wi-Fi, UWB, or ZigBee, and wherein the second communication device comprises at least one of a personal computing device, a laptop, a tablet, a smart phone, or a vehicle computing system.

6. The communication device of claim 4, wherein the instructions, when executed by the at least one processor, further configure the communication device to:
receive second data from a third device; and
transmit the second data to a third device via the second communication protocol.

7. The communication device of claim 1, wherein the instructions, when executed by the at least one processor, further configure the communication device to:
determine at least one second available narrowband or ultra-narrowband channel; and
reconfigure the software defined radio to operate at the at least second available narrowband or ultra-narrowband channel.

8. The communication device of claim 1, wherein the instructions, when executed by the at least one processor, further configure the communication device to:
receive a selection of at least one second available narrowband or ultra-narrowband channel; and reconfigure the software defined radio to operate at the at least second available narrowband or ultra-narrowband channel.

9. A communication system, comprising:
a communication device, wherein the communication device is configured to communicate at least one data packet over a first narrowband channel or a first ultra-narrowband channel; and
at least one repeater device, wherein the at least one repeater device is configured to:
receive the at least one data packet over the first narrowband channel or ultra-narrow band channel from the communication device;
select one of the first ultra-narrowband channel, a second narrowband channel, or a second ultra-narrowband channel;
configure at least one of multiple frequencies, modulation, demodulation, filtering, or amplification via software of the repeater device to re-transmit the at least one data packet to a second communication device over the selected channel; and
retransmit the at least one data packet to the second communication device over the selected channel.

10. The system of claim 9, wherein the at least one repeater device is configured to determine which of the first narrowband channel, the first ultra-narrowband channel, the second narrowband channel, or the second ultra-narrowband channel based on at least one of a distance between the repeater device and the second communication device or at least one transmission or reception condition.

11. The system of claim 9, further comprising a communications server configured to route the at least one data packet from the communication device to an intended recipient device through the at least one repeater device.

12. The system of claim 11, wherein the communications server is further configured to indicate to the at least one repeater device an address of the second communication device.

13. The system of claim 12, wherein the second communication device comprises a second repeater device, wherein the communications server is further configured to indicate to the second repeater device an address of a third communication device.

14. The system of claim 13, wherein the at least one first repeater is configured to communicate the at least one packet over a second communication protocol to the second repeater device.

15. The system of claim 14, wherein the communications server instructs the at least one first repeater device to communicate the at least one packet over the second communication protocol to the second repeater device when the first communication protocol is unavailable or below a quality threshold.

16. The system of claim 9, wherein at least one data packet is communicated according to a first modulation protocol or a first trunking standard, and wherein the repeater device is further configured to:
change at least one of the first modulation protocol or the first trunking standard to at least one of a second modulation protocol or a second trunking standard for retransmitting the at least one data packet to the second communication device.

17. The system of claim 9, wherein the communication device is associated with a first network supporting a first communication protocol, and the second communication device is associated with a second network supporting a second communication protocol.

18. A non-transitory computer-readable medium comprising instructions, that when executed by a processor of a communication device, cause the communication device to perform operations of:
obtaining at least one channel allocation for communicating data, wherein the at least one channel allocation is determined from a detected portion of unused spectrum;
adjusting a software defined radio of the communication device to communicate over at least one channel corresponding to the at least one channel allocation by configuring at least one of a frequency of multiple frequencies, modulation, demodulation, filtering, or amplification of the software defined radio via software; and transmitting data over the at least one channel via the adjusted software defined radio.

19. The non-transitory computer readable medium of claim 18, wherein the at least one channel allocation comprises a list of available channels, and wherein the instructions, when executed by the processor of the communication device, cause the communication device to perform additional operations of:

determining the at least one channel over which to communicate data from the list of available channels.

20. The non-transitory computer readable medium of claim 18, wherein the instructions for obtaining the at least one channel allocation for communicating the data further comprises instructions for receiving the at least one channel allocation for communicating the data from a repeater device.

\* \* \* \* \*